United States Patent
Cox

(10) Patent No.: US 6,565,607 B1
(45) Date of Patent: May 20, 2003

(54) LABELING SYSTEM AND PROCESS

(76) Inventor: Kenneth C. Cox, 1204 Karla Dr., Hurst, TX (US) 76053-4431

(*) Notice: Subject to any disclaimer, the term of this patent is extended or adjusted under 35 U.S.C. 154(b) by 0 days.

(21) Appl. No.: 09/191,230

(22) Filed: Nov. 13, 1998

(51) Int. Cl.[7] .................. G06F 15/00; G06F 17/21; G06F 17/24
(52) U.S. Cl. ............ 715/500; 715/517; 715/513; 358/1.18
(58) Field of Search ............ 715/500, 513, 715/10, 7, 517; 705/408; 340/5.74; 358/1.1, 1.18

(56) References Cited

U.S. PATENT DOCUMENTS

| | | | | |
|---|---|---|---|---|
| 5,621,864 A | * | 4/1997 | Benade et al. ............. | 358/1.18 |
| 5,644,682 A | * | 7/1997 | Weinberger et al. ......... | 358/1.1 |
| 5,963,967 A | * | 10/1999 | Umen et al. ................ | 707/513 |
| 5,987,461 A | * | 11/1999 | Dreyer et al. ............... | 707/7 |
| 6,108,656 A | * | 8/2000 | Durst et al. ................ | 707/10 |
| 6,140,936 A | * | 10/2000 | Armstrong ................ | 340/5.74 |
| 6,208,980 B1 | * | 3/2001 | Kara ........................ | 705/408 |
| 6,327,599 B1 | * | 12/2001 | Warmus et al. ............. | 707/517 |

OTHER PUBLICATIONS

Gauthier, Forrest P., Variable Printing: Positive Growth, In–Plant Printer, Libertyville, Oct. 1998, vol. 38, Issue 5, pp. 12–14.*
WordPerfect Version 6.1 for Windows, Apr. 15, 1996 Corel Corporation, screenshots pp. 1–24.*
Berghel, Hal, Watermarking cyberspace, Communications of the ACM, Nov. 1997, vol. 40, Issue 11, pp. 19–24.*
Mass Mailing Labels, IBM Technical Disclosure Bulletin, May 1986, vol. 28, Issue 12, pp. 5235–5236.*

* cited by examiner

Primary Examiner—Joseph H. Feild
Assistant Examiner—William L. Bashore
(74) Attorney, Agent, or Firm—Arthur F Zobal

(57) ABSTRACT

A network system is provide which includes a computer with a monitor and a storage device and a printer separate from the computer. A computer program is provided for creating a file that when sent to the printer will produce multiple sets of a document with a label applied to selected pages of the document and wherein images of selected document pages and labels may be viewed on the monitor, merged for viewing on the monitor, stored, and then printed. In another embodiment a data file of information may be selected and selected fields merged on selected document pages, stored and then printed.

2 Claims, 27 Drawing Sheets

LABELING SYSTEM AND PROCESS

BACKGROUND OF THE INVENTION

1. Field of the Invention

The invention relates to a network system and process using a computer and printer for merging images of labels onto a document for printing purposes.

2. Description of the Prior Art

Xerox Corporation has a process and system for merging labels onto a document for printing purposes. The system is an integral unit and includes a computer and a printer and the system uses a labeling program which can operate only on the integral printer for real time printing.

SUMMARY OF THE INVENTION

It is an object of the invention to provide a network system and process which includes separate a computer and printer for merging images of labels on a document for printing purposes which can be used with many types of printers.

The system and process allows label image files, document image files, and the merged files to be viewed on the monitor of the separate computer.

In a further aspect there is provided a new process using the same system to merge data from stored files with document files for printing purposes.

In both embodiments, the merged labels and documents and merged data and documents may be stored prior to printing.

DESCRIPTION OF THE PREFERRED EMBODIMENTS

Figure 1:
FIG. 1 illustrates the hardware of the system of the invention.
Figure 1:
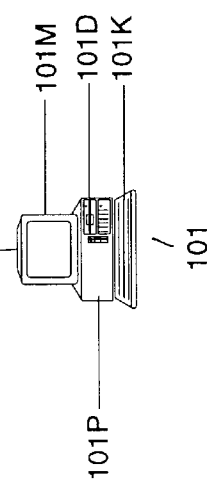

Referring now to FIG. 1, there is provided a network system comprising two computers 101 and 103, a controller 105 coupled to a printer 107 by way of communication line 109. The computers 101 and 103 and controller 105 are coupled together by way of a communication line 113. The computer 101 comprises a monitor 101M, a processor 101P with a hard drive storage unit 101D and a keyboard 101K, and a mouse (not shown). The computer 103 comprises a monitor 103M, a process or 103P with a hard drive storage unit 103D and a keyboard 103K and a mouse (not shown). The controller 105 comprises a processor 105P, with a hard drive storage unit 105D, a keyboard 105K and a mouse (not shown), and a monitor 105M. The units 105 and 107 are packaged as a singe unit. The hard drives 101D, 103D, and 105D can be shared by either of the units 101, 103, 105. The monitor 105M is used for operator interface to the printer.

In one embodiment, the controller 105 and printer 107 may be a Sun Controller and a printer available from the Xerox Corporation which can save or print material sent to it. The invention uses a network filing system (NFS) that allows a computer disk drive to be shared over a network, a PostScript language program sent to the printer and tiff images that are created by the decomposition process of the printer. Table I discloses a PostScript program created in the first embodiment of the invention. A tiff image is a bit map file format developed by Aldus Corp. that represents an image of a page. PostScript is a programming language developed by Adobe Systems. The user can specify which directory the files are to be saved in. Thus there is provided a common directory which can be accessed by both the software, which is run on, for example computer 101, and by the printer controller 105. The common directory may be the hard drive 101D, 103D, or hard drive 105D.

Figure 2:
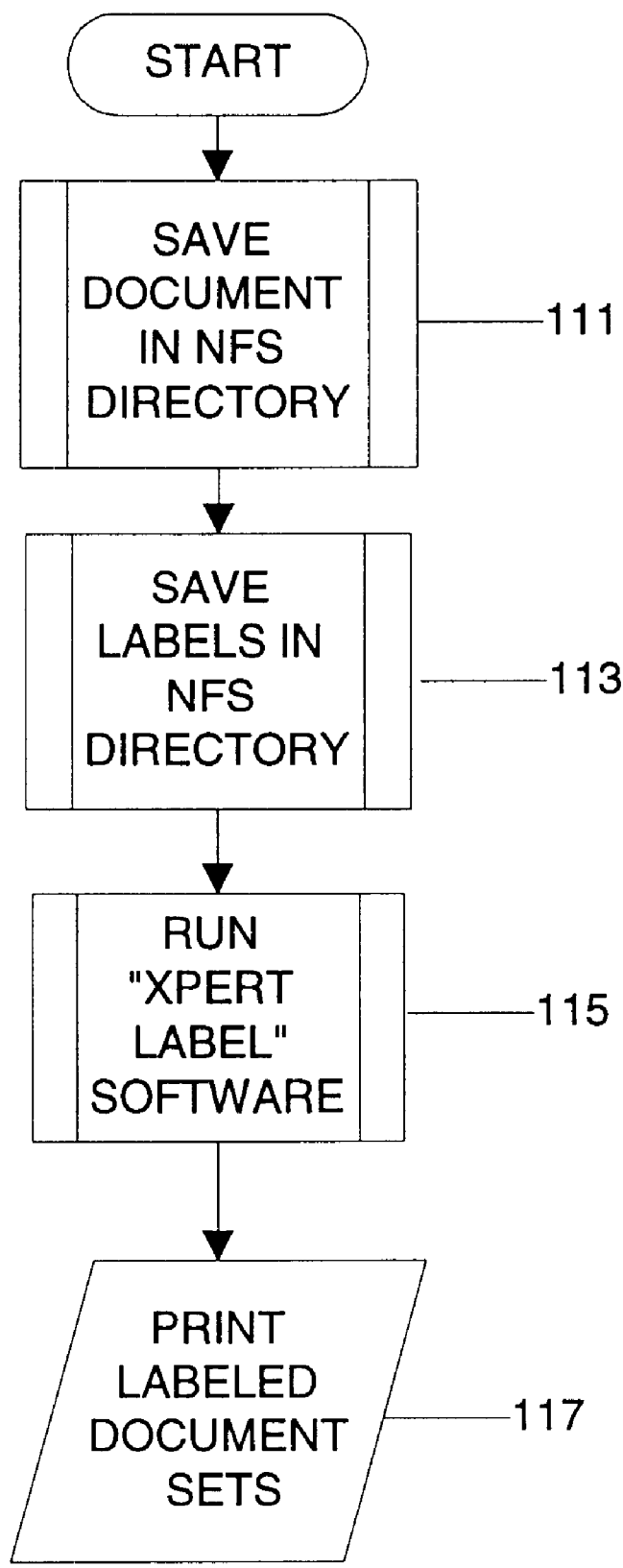
FIG. 2 is a broad flow diagram of the label embodiment of the invention.

Referring to FIG. 2, blocks 111, 113, 115, and 117 illustrate an overview of the process. The user will create a document at 111 which may be one or more pages and a label file at 113 which may include one or more labels; which are decomposed and saved in the directory. The software 115 controls a print command 117. The document and label print files are sent to the printer with a disposition of save in the NFS directory. The save location is a specific directory that the printer controller and the software view as a local directory through NFS.

It is to be understood that the print document and labels may be decomposed and saved in the directory or hard drive 101D of the computer 101 rather than hard drive 105D.

Figure 3A:
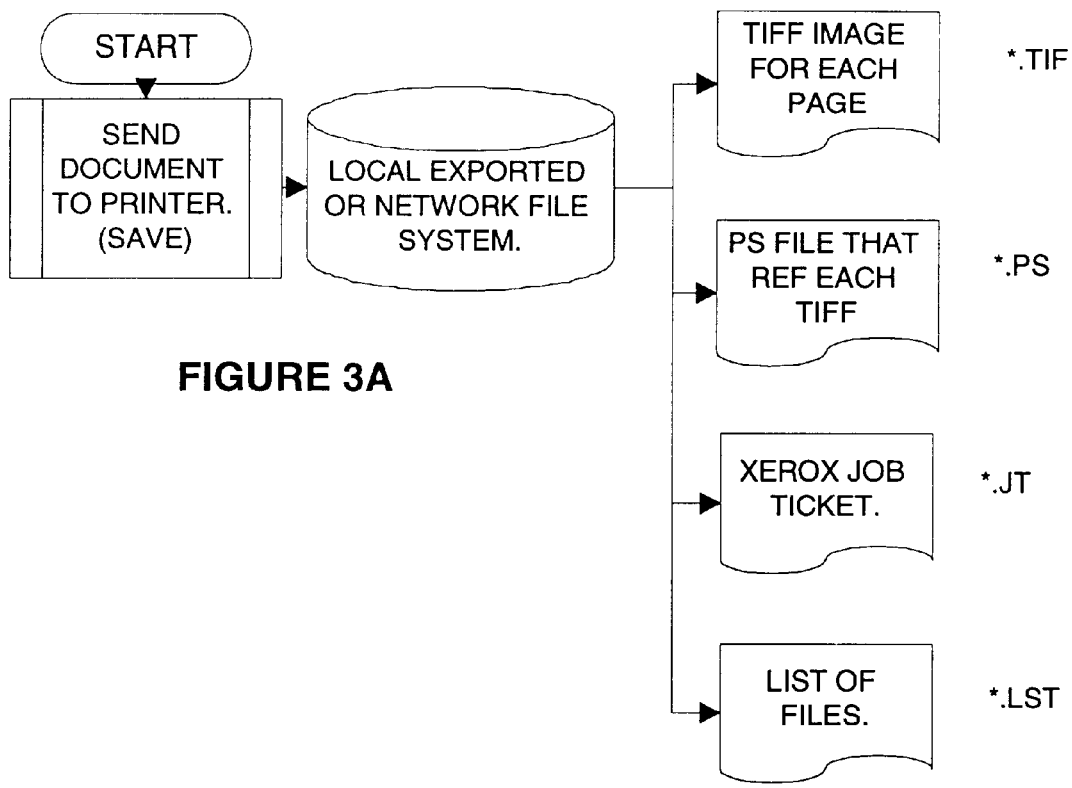
FIGS. 3A and 3B illustrate prior art decomposition services which are used in the invention.
Figure 3B:
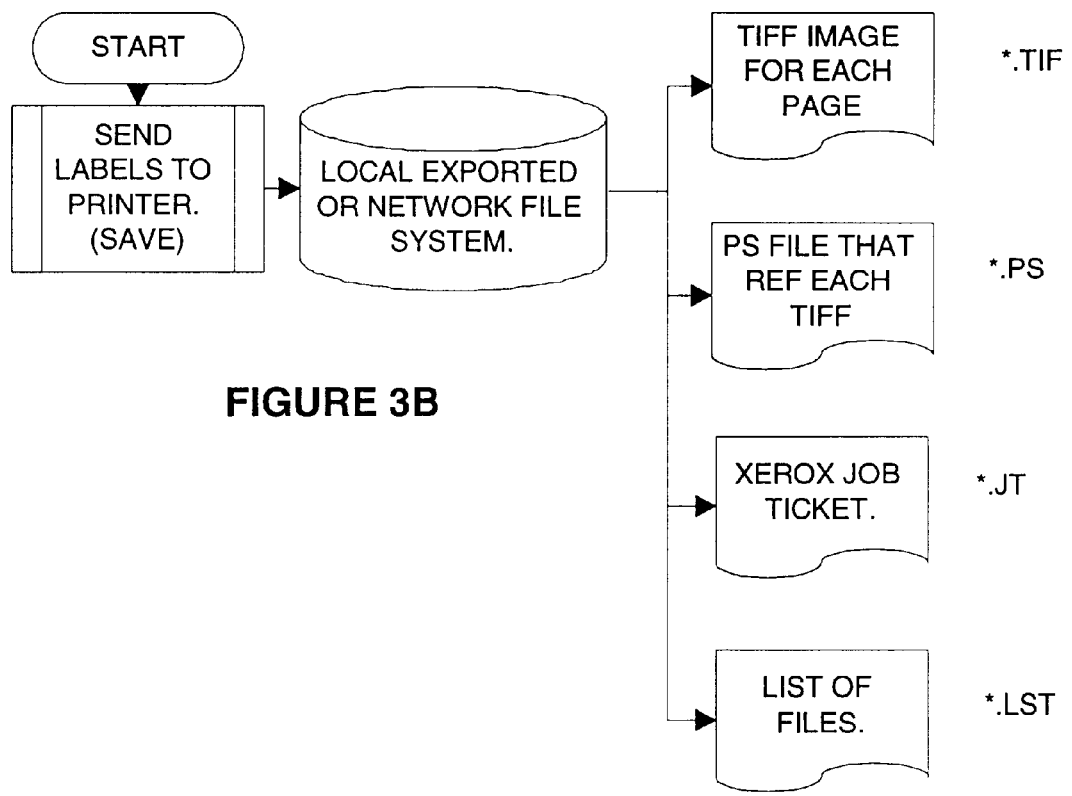

The printer creates several different files in the NFS directory. Referring to FIGS. 3A and 3B it will create a tiff image .tif for each page; a postscript file .ps that refers to each tiff image; a Xerox job ticket file .jt (See Table 2); and a list of files .lst (See Table 3) which contains a list of each tiff image in the document. The .jt files contains some special Xerox commands for the Xerox printer that the Postscript language does not support. The end result is that for each one of the documents saved, all these files will be created. The next step in the process is that the Xpert label software is run and the labeled document sets are printed.

Figure 4:
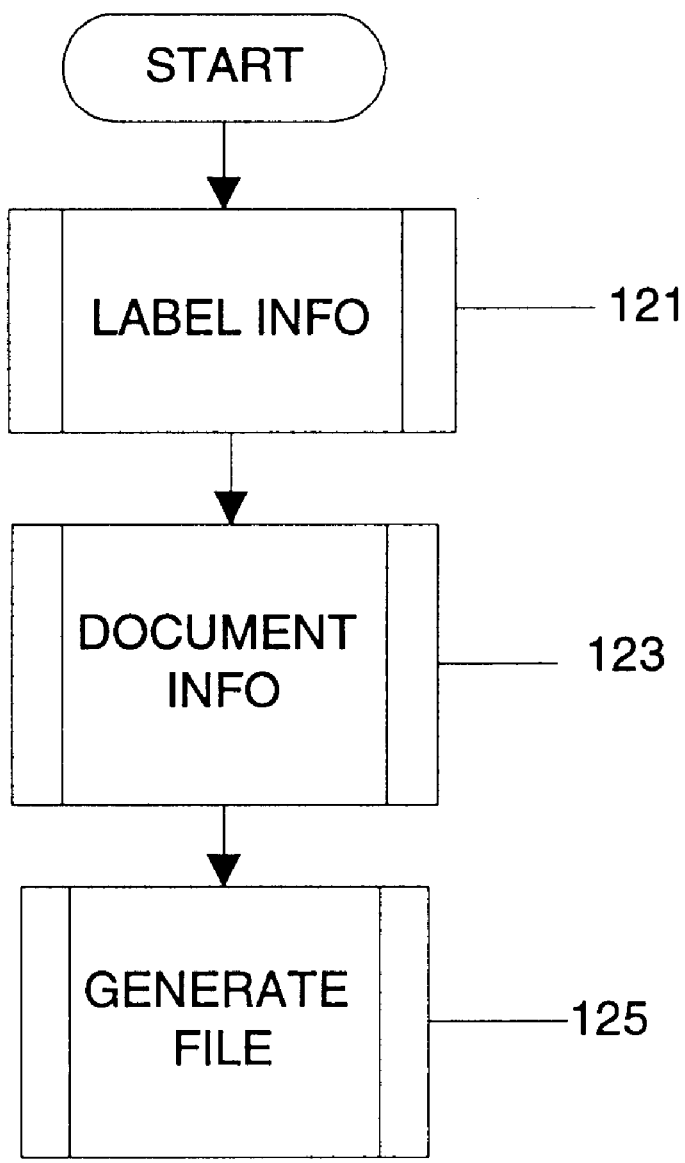
FIG. 4 is a broad flow diagram of the label software routine.

Referring to FIG. 4, when the Xpert label software comprises a label information routine defined at 121, a document information routine defined at 123, and a new print file generated at 125 which creates the merged documents.

Figure 5A:
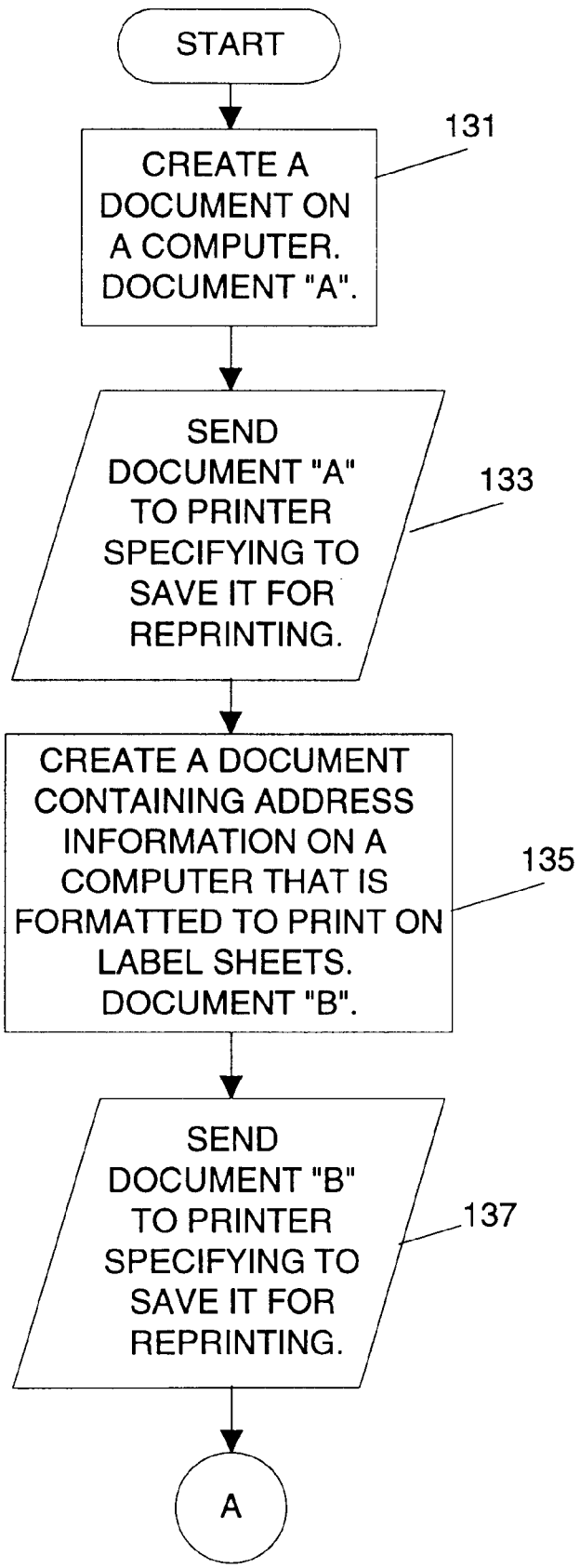
FIGS. 5A, 5B, and 5C are a more detailed flow diagram of the label embodiment.
Figure 5B:
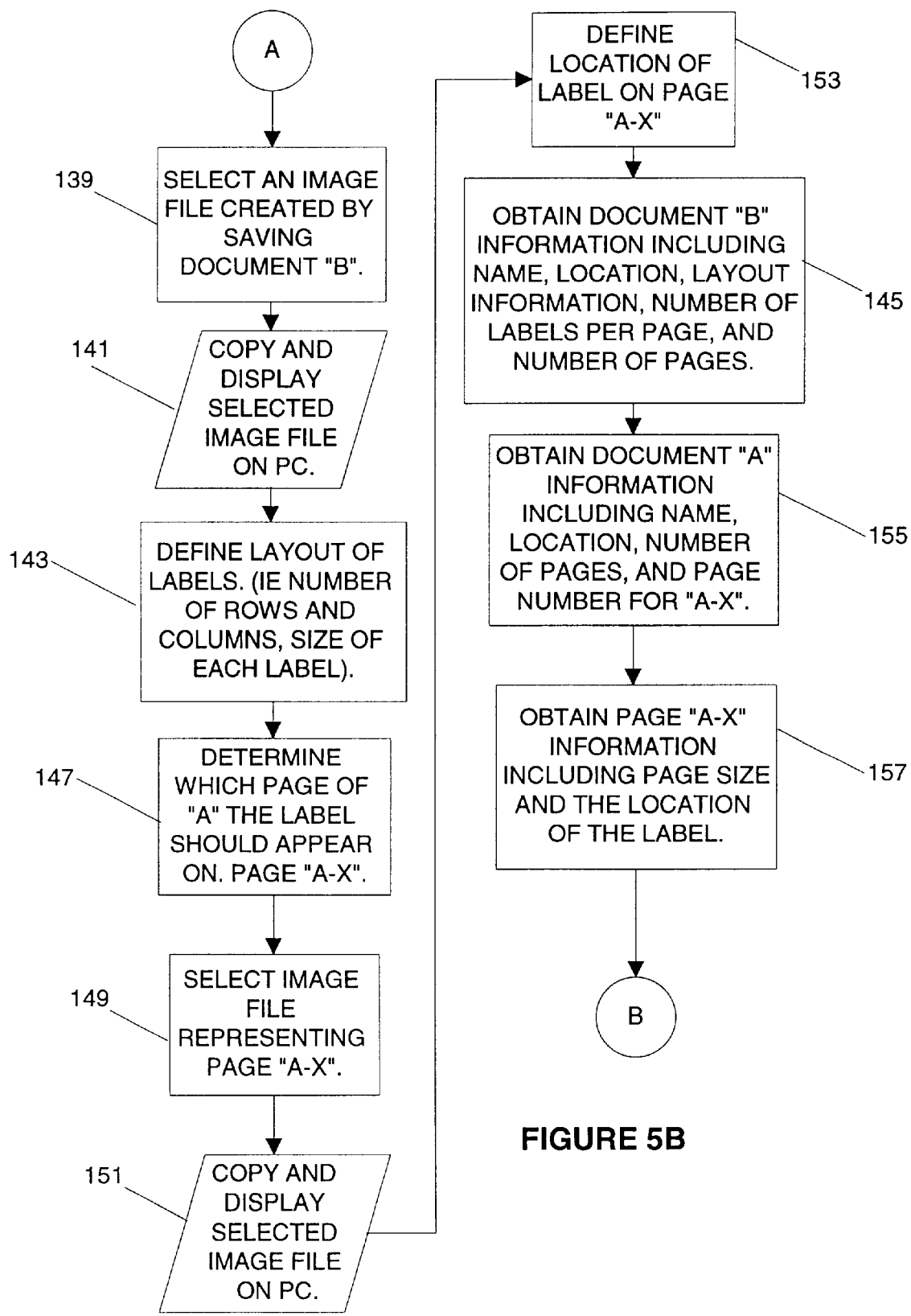
Figure 5C:
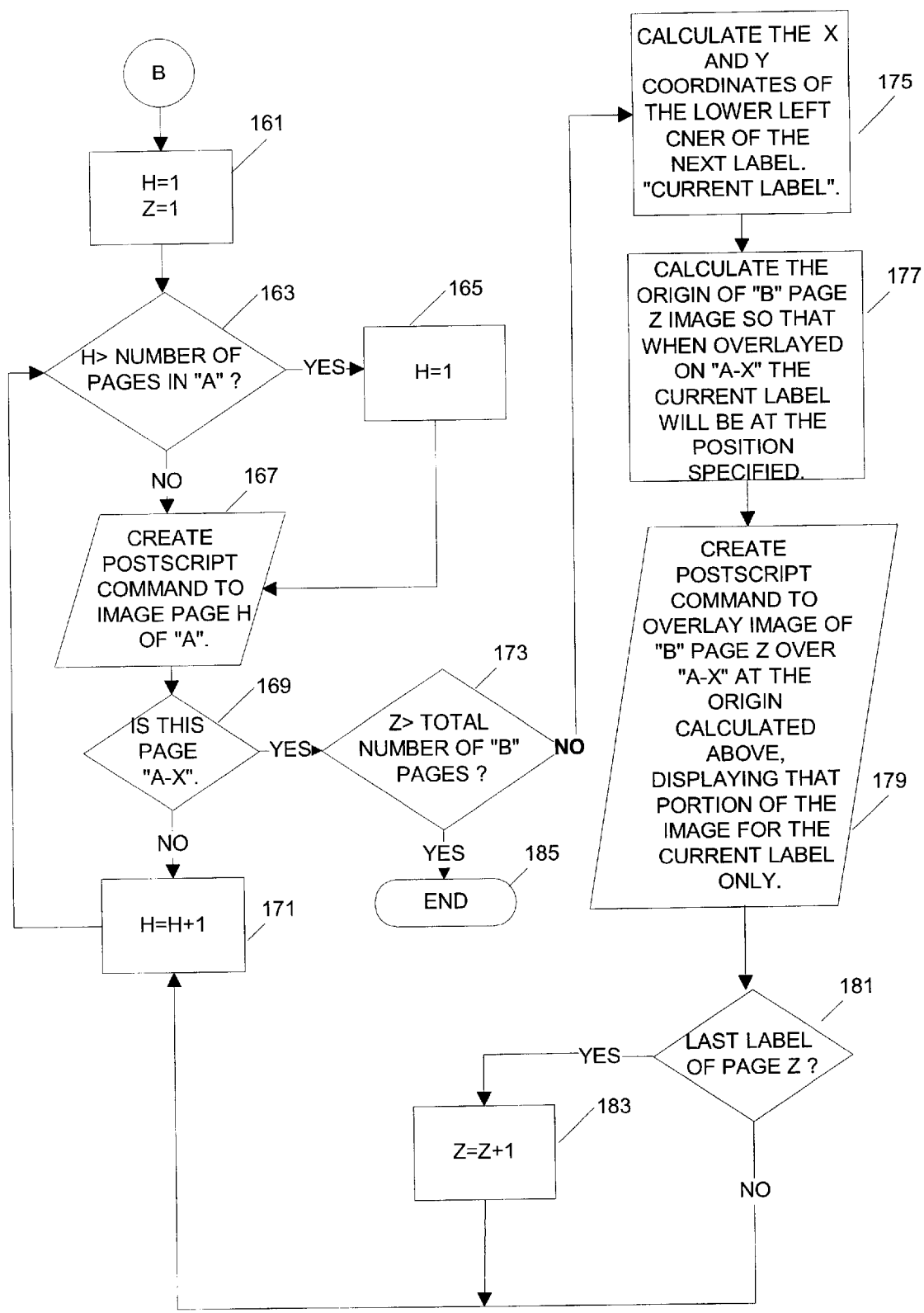

Before going into the details of the processes of routines 121, 123, and 125, reference will be made to FIGS. 5A, 5B, and 5C which is a flow diagram of the process. A new document "A" is created on a computer, i.e. 101, at 131 and sent to the printer at 133 decomposed and saved for reprinting. The document may have one or many pages. A label document "B" containing address information is created by a computer at 135 and formatted to print on label sheets. It is sent to the printer at 137, decomposed and saved for reprinting. The label document may have one or more pages of labels with each page having one or more labels. When a document is saved at the printer, the printer will create an image file for each page in the document. The image files are saved to a disk drive so that they may be retrieved for printing at a later time. Next the operator at 139 selects an image file created by decomposing and saving the label document "B". Next as indicated at 141, the image file is copied and displayed on the monitor 101M of the computer 101. At 143 the layout of the labels is defined (i.e. the number of rows and columns, size of each label). At 145, label document "B" information is stored. This information includes the name, location, layout information, number of labels per page, and number of pages. The procedure of 145 can take place after the procedure of 143 or after the procedure of 153 as shown. At 147 there is determined which page of "A" of the document the label should appear on, i.e. Page "A-X". At 149 there is selected an image file representing page "A-X". At 151, the selected image file is copied and displayed on the monitor 101M of the computer 101. At 153, the location of the label on page "A-X" is determined. At 155, there is obtained stored document "A" information including the name, location, number of pages, and page number for "A-X". At 157, there is obtained page "A-X" information including page size and the location of the label. At 161, there is provided a counter H for the main document "A" and a counter "Z" for the label document "B". At 163, 165, 167, 169, and 171 there is provided a loop for creating a PostScript command to image all of the pages of document "A". At 169, the page "A-X" is determined. At 173 a decision is made. At 175 for each label, the X and Y coordinates of the lower left corner is calculated. At 177 the origin of the "B" page Z image is calculated so that when overlayed on "A-X", the current label will be at the position specified. The origin preferably is at the lower left corner of the page. At 179 there is created a Postscript command to overlay image "B" page Z over "A-X" at the origin calculated, and display that portion of the image for the current label only. At 181 and 183 the last label of page Z is determined. At 185 the process is completed and sent to the printer.

Figure 6:
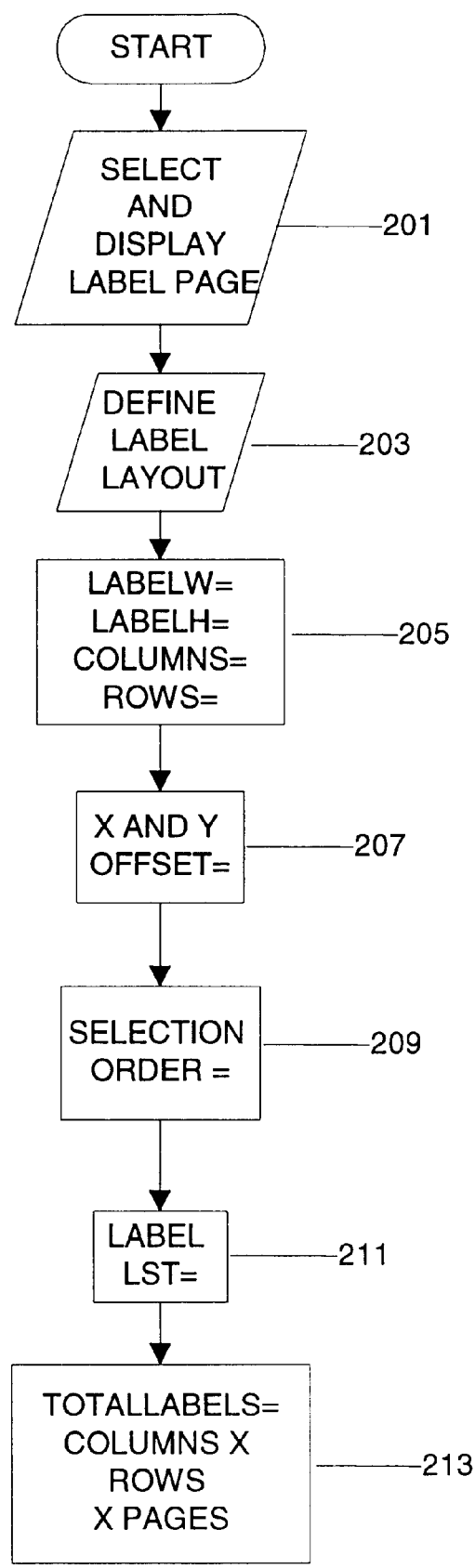
FIG. 6 is a flow diagram of the label information routine of FIG. 4.

Referring now to FIG. 6, the label information routine 121 will be described. At 201, the user navigates to the location where the label file was saved. This directory contains a tiff image of each page of the saved document. A specific label file is selected whereby a list of individual pages or tiff images are displayed. The user will select one of those tiff images which is displayed on the computer monitor screen. At 203, the user defines the label layout and at 205 the user will input characteristics of the layout of that label including the label width W, height H, the number of columns and rows of the label and at 207 the X and Y offsets to the first label at the top left corner of the page are determined. At 209, the user will specify the selection order in that the user can select the labels left to right across the page, top to bottom, right to left, bottom to top, etc. In addition, to the label format information, at 211 the software will capture the name of the ".LST" file associated with this label document. The ".LST" file contains a list of each tiff image including name, and the path, for each page of the saved label document. In addition, there will be calculated the total number of labels or possible number of labels based on the number of columns, the number of rows and the number of pages extracted.

Figure 7:
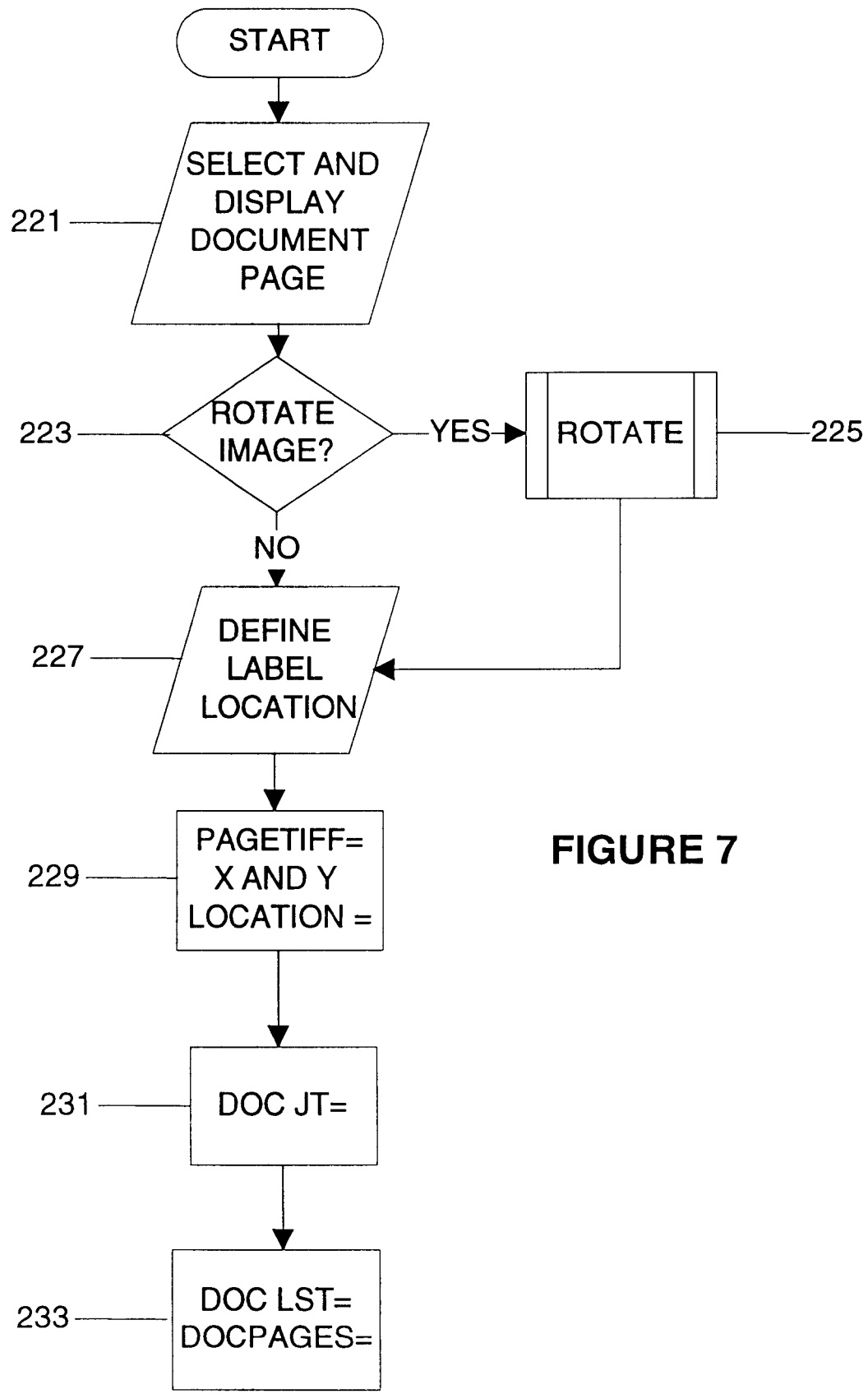
FIG. 7 is a flow diagram of the document information routine of FIG. 4.
Figure 8:
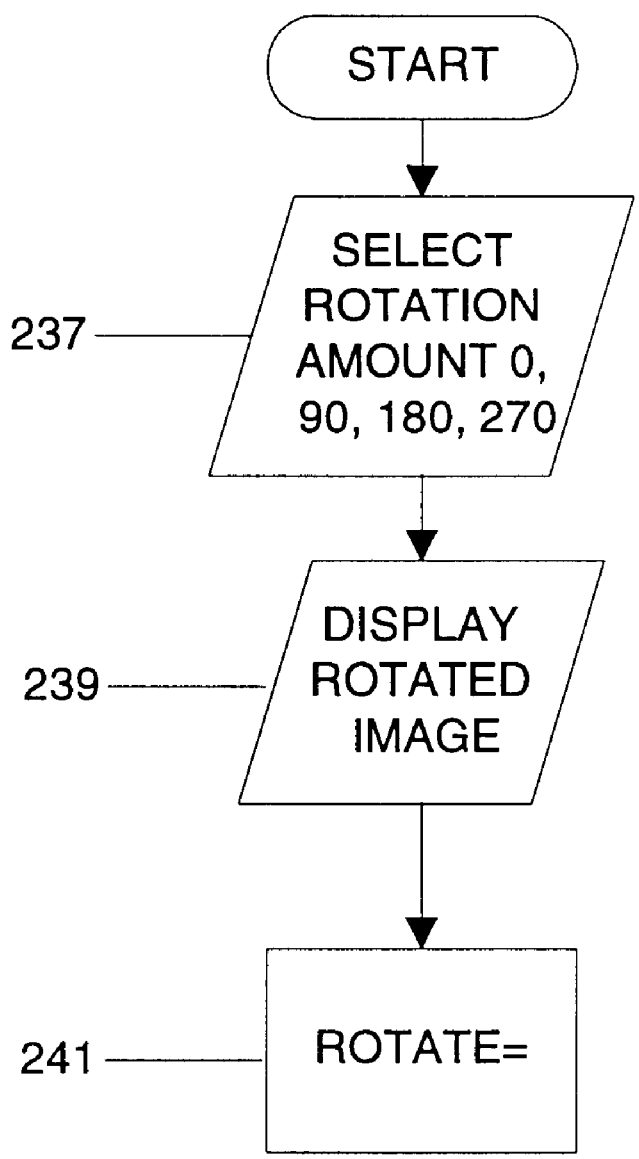
FIG. 8 is a flow diagram of the rotate image routine of FIG. 7.

Referring to FIG. 7, there will be described the document information routine. At 221, the user navigates to the location where the document file was saved. This directory contains a tiff image of each page of the saved document. The user selects the specific page that the label should appear on. Typically this will be the first or last page. At 223 and 225, the user has the option of rotating that page to four different positions 0, 90°, 180°, or 270°. As shown in FIG. 8, at 237, 239, and 241, if the user chooses to rotate the image, it is displayed in a rotated mode and assigned the appropriate PostScript commands necessary to rotate the page the desired amount and to reset the origin to the lower left of the page to the variable "rotate". This variable will be called before the label procedure for the page where the label will appear. Referring again to FIG. 7, at 227 the label location is defined. In one embodiment there will be displayed, a yellow highlighted rectangle which is the same size as that of the label. At that point, the user can select and drag it to a position on the page to the desired location. At 229, there is captured the sequential name and number tiff image for this particular page and the label location relative to the lower left of the page. At 231 there is captured the name and location of the ".JT" file associated with the saved document. The ".JT" file is the file that contains all of the Xerox Job Ticket information necessary for representing the original document including paper specification, document finishing options, etc. At 233 there is captured the name and location of the ".LST" file associated with this document. The ".LST" file contains a list of each tiff file including the name, and path for each page of the saved document. The total pages in the document are calculated.

Figure 9:
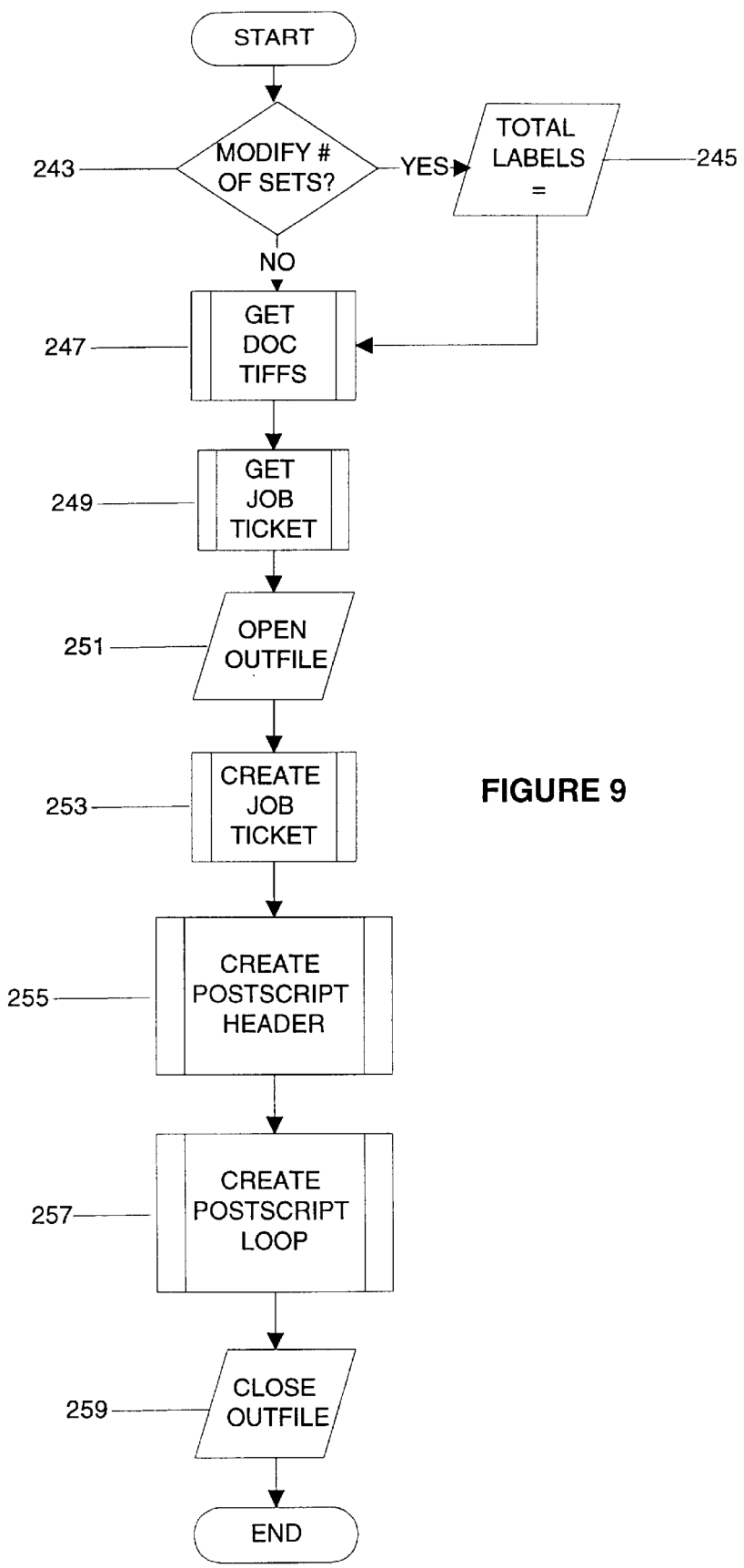
FIG. 9 is a flow diagram of the Generate File routine of FIG. 4.

Referring to FIG. 9, there will be described the generate file routine. In the label information routine, there was captured the total possible number of labels. However, there is a possibility that the last page labels is not a complete page. At 243 and 245, user has the option of putting in a number less than that calculated. At 247, the next part of the process is to get the document tiff image name and the location. The job ticket records of that document also are obtained at 249. An output file is opened at 251 for creating a new file and the information read from the, job ticket will be used to create a new job ticket 253. A PostScript Header 255 is created since a number of the functions that are performed inside of the PostScript Code are in a macro or subroutine. Next a PostScript loop is created at 257. This loop is based on the total number of sets that the user wanted to produce. The out file then is closed at 259.

The generate file procedure of FIG. 9 creates a new PostScript file with a Xerox Job Ticket pretended to it. When sent to the printer, this file will render multiple sets of the original document each with a label on a specific page.

Figure 10:
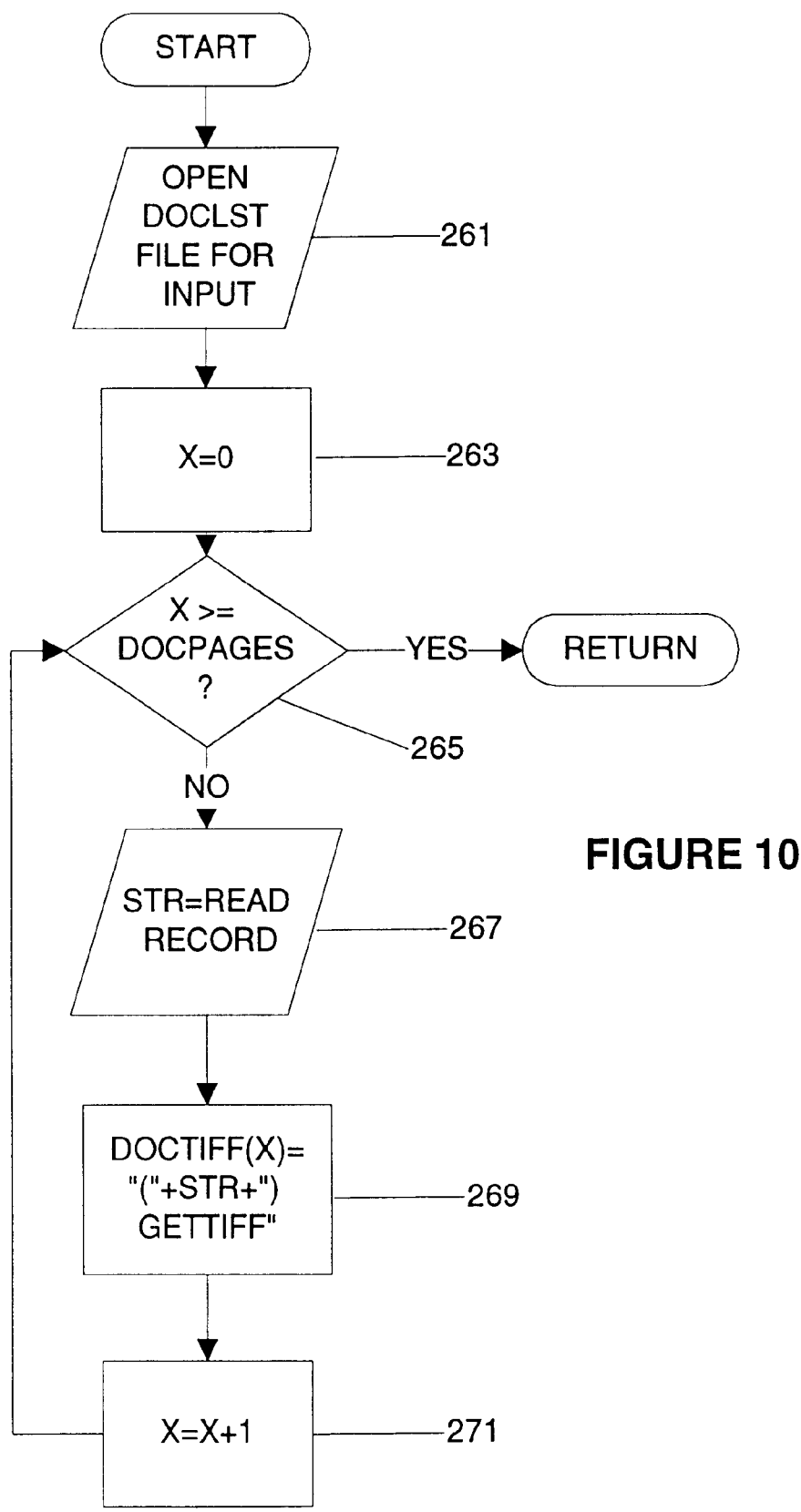
FIG. 10 is a flow diagram of the Get Doc Tiffs routine of FIG. 9.

Referring now to FIG. 10, the Get Doc Tiffs routine of FIG. 9 will be described. The Doc LST file contains the path name and location of each one of the tiff images. It is opened for input at 261 and a variable X is set equal to zero at 263. The process loops through the known document pages at 265, 267, 269, and 271. At 267, a record from the LST file is read and at 269 a PostScript command to image that page is created. The Get Tiff command is a PostScript macro that will read the tiff image off of the disk. At 269, it is saved as a variable for now, under Doc Tiff(x). The Get Doc Tiffs procedure thus reads the document ".LST" file. For each record read, there is built a PostScript command to image the page and assign the string to an array doctiff( ).

Figure 11:
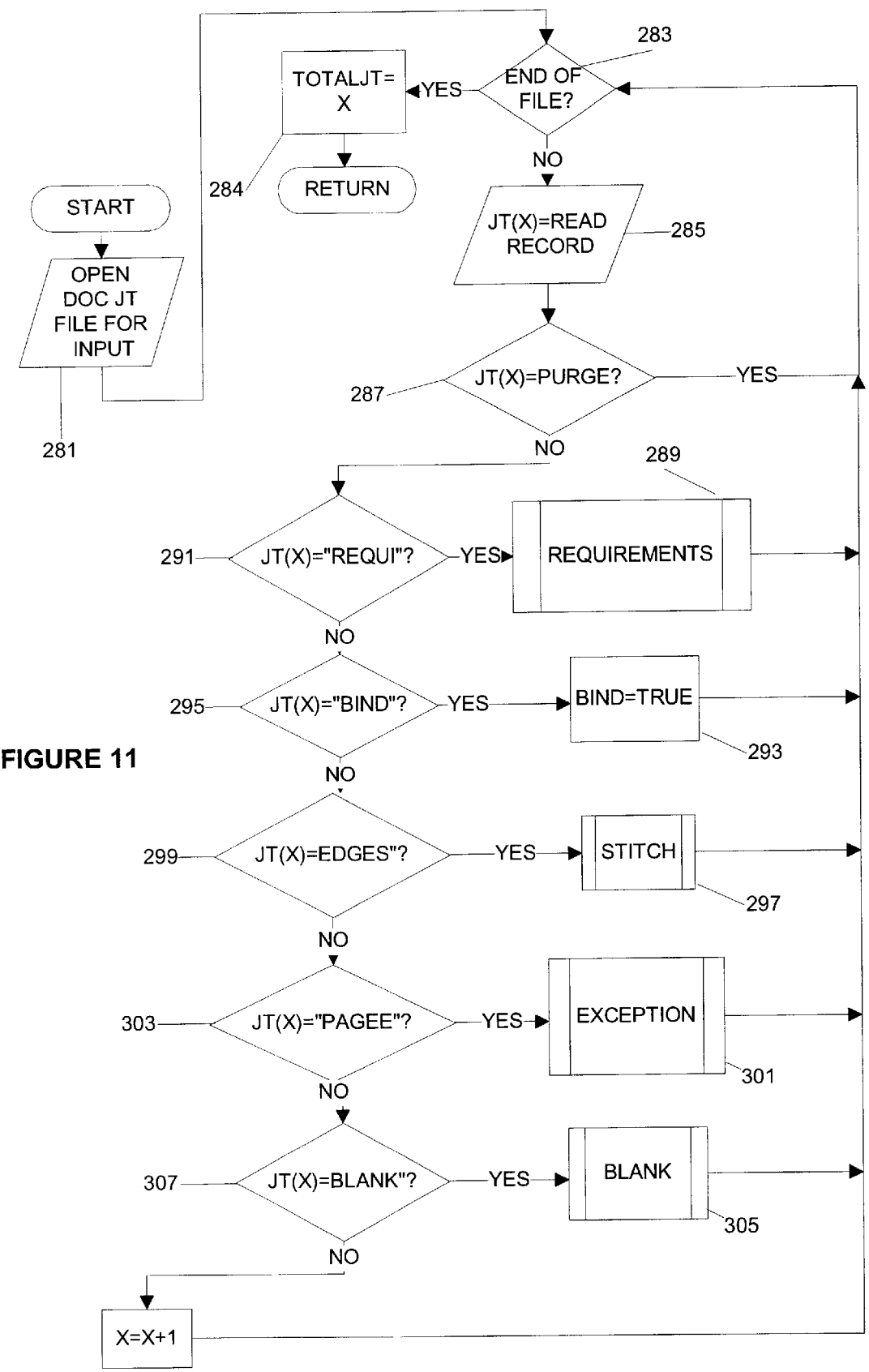
FIG. 11 is a flow diagram of the Get Job Ticket routine of FIG. 9.

Referring to FIG. 11, there will be described the Get Job Ticket routine. This procedure reads the saved document Job Ticket File, purges certain records, saves the "mandatory" records, builds PostScript commands for "finishing" records, and saves "exception" and blank page "insert" records. At 281 the Doc JT file for input is opened and at 283 the procedure checks to determine if it is the end of the file and if so it goes to 284 where the total number of retained job ticket records are stored. There are certain job ticket commands in the original file that cannot be used when a new file is created. The records are read at 285 and assigned to an array JT( ) and a determination is made at 287 if they are purge records. Resolution of the print image will be maintained by the software.

A decision on if JT(x) contains "requirements" is made at 291. A requirement may be "duplex" (copy on both sides) which is to be maintained. There are other attributes such as "collate", that may be discarded.

The particular printer used has the ability to bind with a thermal tape or to stitch with metal staples. At 295 there is a decision on if JT(x) contains "bind" indicating that this document requires binding. At 293 a variable bind is set to true.

At 299 there is a decision on if JT(x) contains "edges" indicating that this document requires stitching. At 297 the stitch procedure is entered.

At 303 there is a decision on if JT(x) contains "pagee" exception. At 301 the exception procedure is entered.

At 307 there is a decision on if JT(x) contains "blank" indicating that the record is a blank page insert. At 305 the blank procedure is entered.

Figure 12:
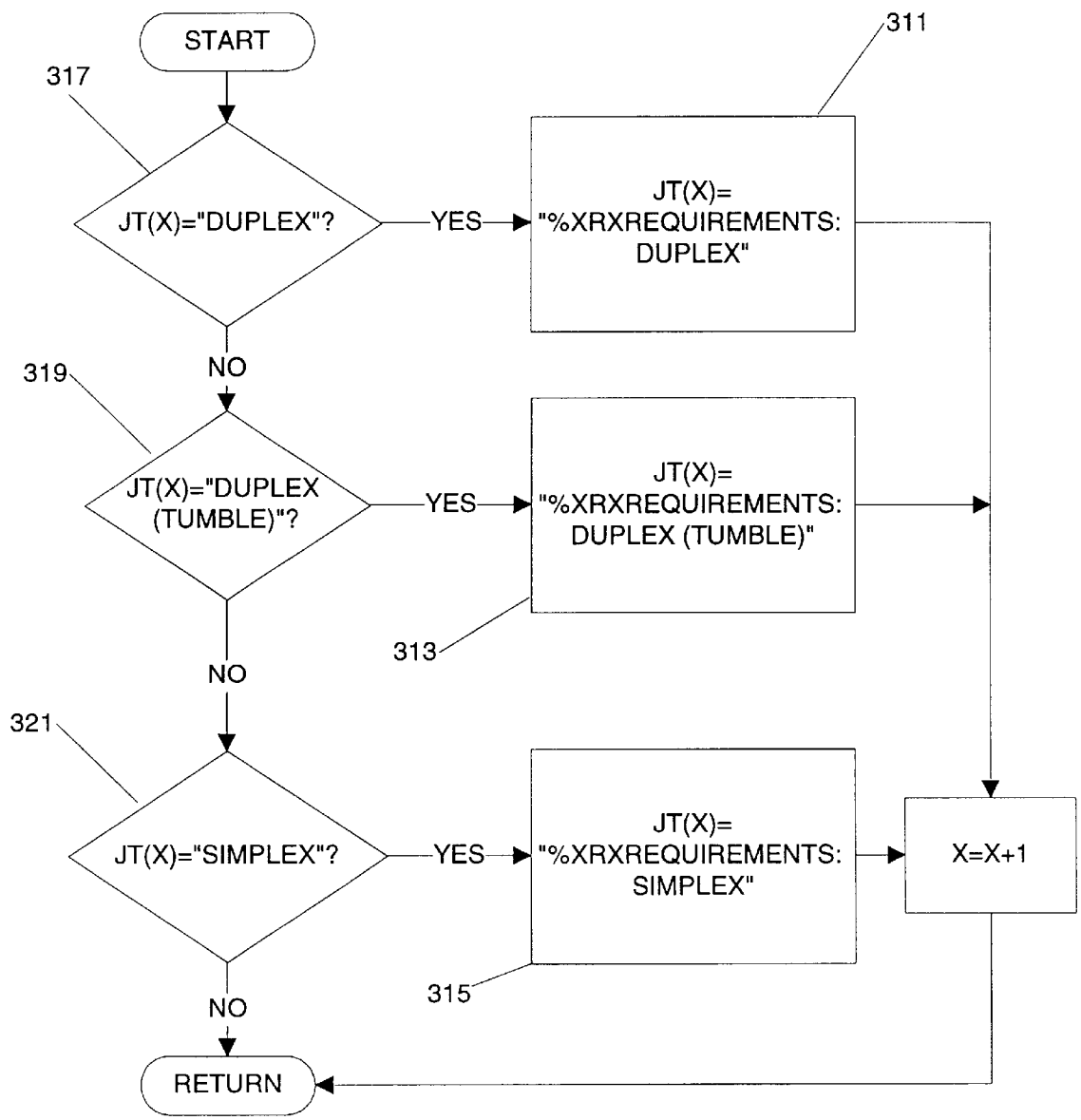
FIG. 12 is a flow diagram of the requirements routine of FIG. 11.

Referring to FIG. 12, the requirement procedure will be described. This procedure is designed to maintain the "plex" attributes only of the requirements. If there are other attributes such as "collate" or "uncollate" they will be disregarded. Duplex, duplex tumble, and simplex requirements are indicated at sections 311, 313, and 315 and decision are made at 317, 319, 321. Upon reading through the job ticket file, if duplex, duplex tumble or simplex is found, a job ticket is created for those requirements. Duplex refers to printing on both sides of a page. Duplex tumble refers to printing one side of a page and to start printing on the other side by turning the bottom end of the page up and over. Simplex refers to printing on one side of a page.

Figure 13:
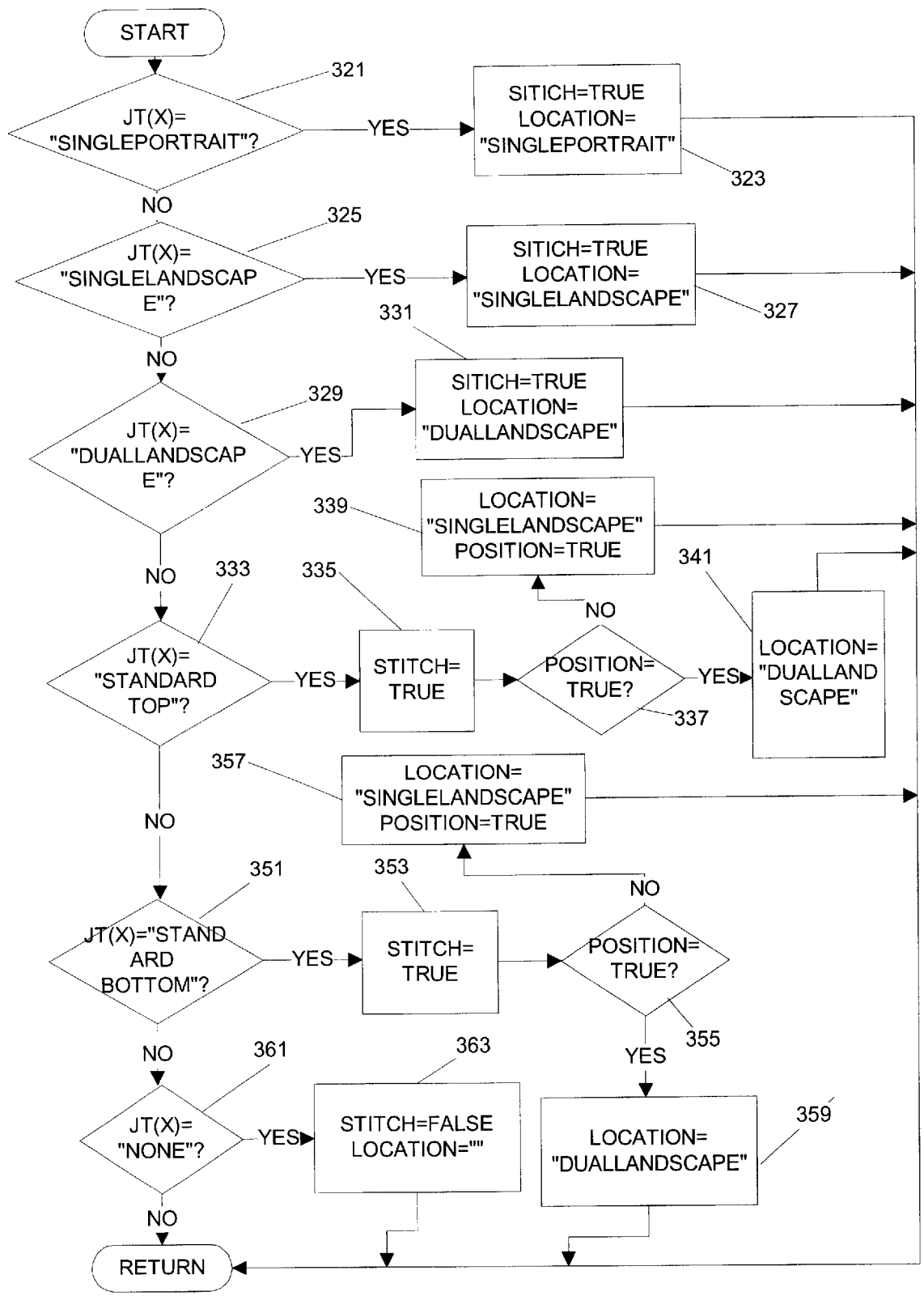
FIG. 13 is a flow diagram of the stitch routine of FIG. 11.

Referring to FIG. 13, there will be described the stitch procedure which examines the Job Ticket stitching record and builds an appropriate PostScript "set page device" command. This procedure will be entered if a job ticket record is found that has an "edge S". The procedure at 321 looks for the word single portrait and if found, at 323 a variable, stitch, is set to be true and location set to be single portrait. The procedure at 325 looks for the word single landscape, and if found, the procedure at 327 sets stitch to be true and location to be single landscape. The procedure at 329 looks for the word dual landscape and if true, at 331 the procedure sets stitch to be true and location to be dual landscape.

In the Job Ticket, the user can specify a custom location for stitching. At 333 the procedure looks for a standard top and if found at 335, stitch is set to be true. A decision is made at 337 as to whether the position is true. If no, the procedure goes to 339 where the stitch is set to single landscape and if true, the procedure goes to 341 and the stitch is set to dual landscape. A similar procedure is followed at 351, 353, 355, 357 and 359 for a standard bottom.

There also is an option at 361 to determine if stitching is equal to "none", in which case the variable stitch at 363 is set to false.

Figure 14:
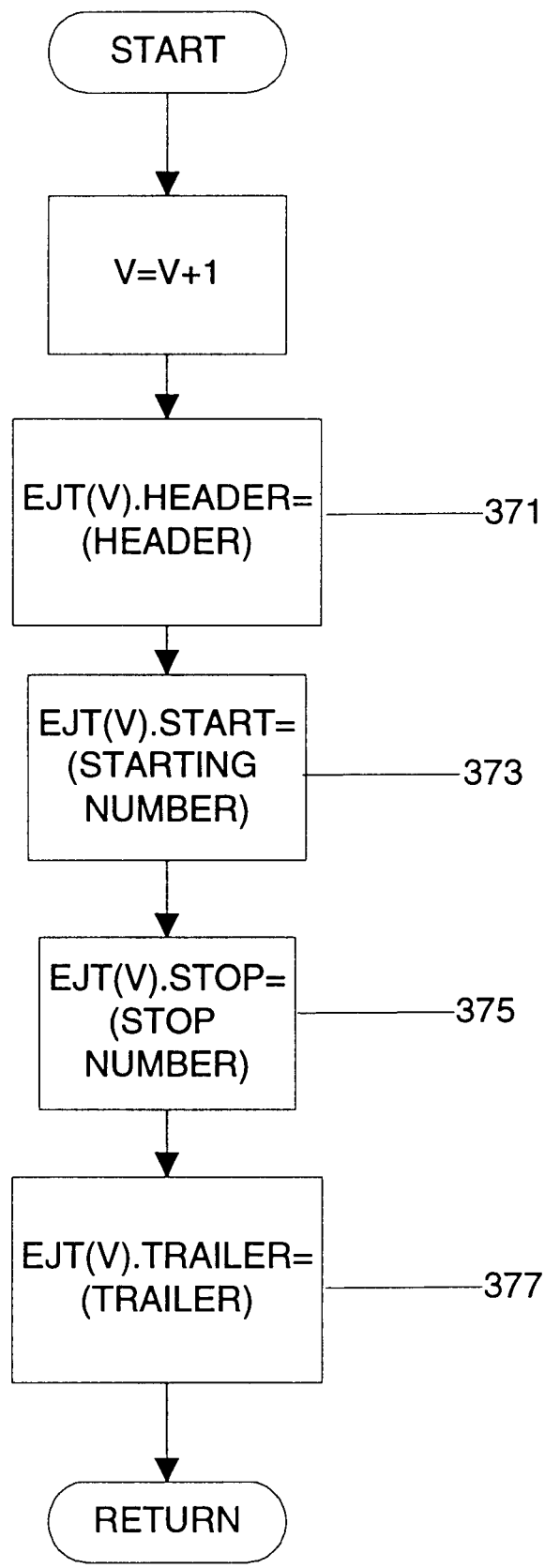
FIG. 14 is a flow diagram of the Exception routine of FIG. 11.

Referring to FIGS. 14, there will be described the exception procedure which includes sections 371, 373, 375, and 377. This procedure builds a separate array for the "Exception" Job Ticket records. Each array has 4 elements, header, start, stop, and trailer. The start is the starting page number, the stop is the ending page number. These elements must be captured separately so that the starting and ending page numbers may be incriminated when producing multiple sets of the document in the final output file.

Figure 15:
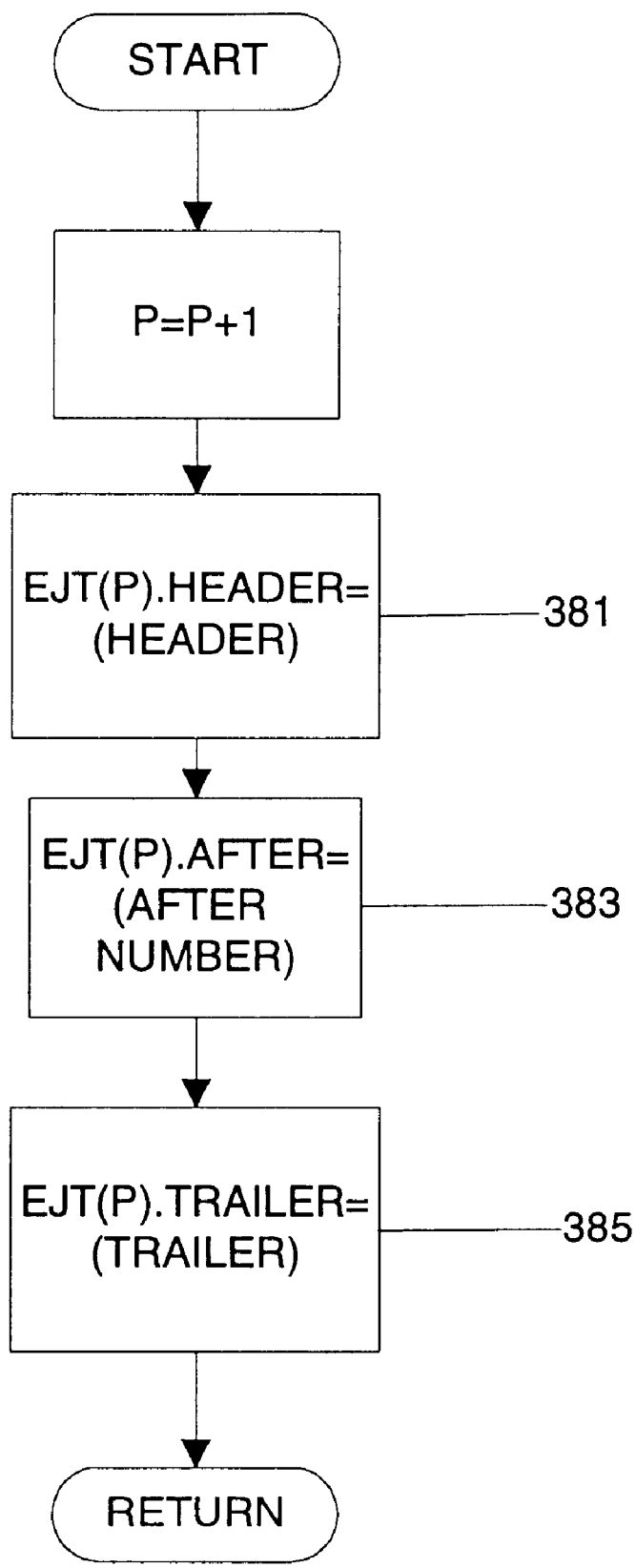
FIG. 15 is a flow diagram of the Blank routine of FIG. 11.

Referring to FIG. 15, there will be described the blank page procedure which includes sections 381, 383, and 385. This procedure builds a separate array for the "BlankPage-Insert" job ticket records. Each array has 3 elements, header, after, and trailer. The after is the page number that the inserts are to be inserted after. These elements must be captured separately so that the after number may be incriminated when producing multiple sets of the document in the final output file.

Figure 16:
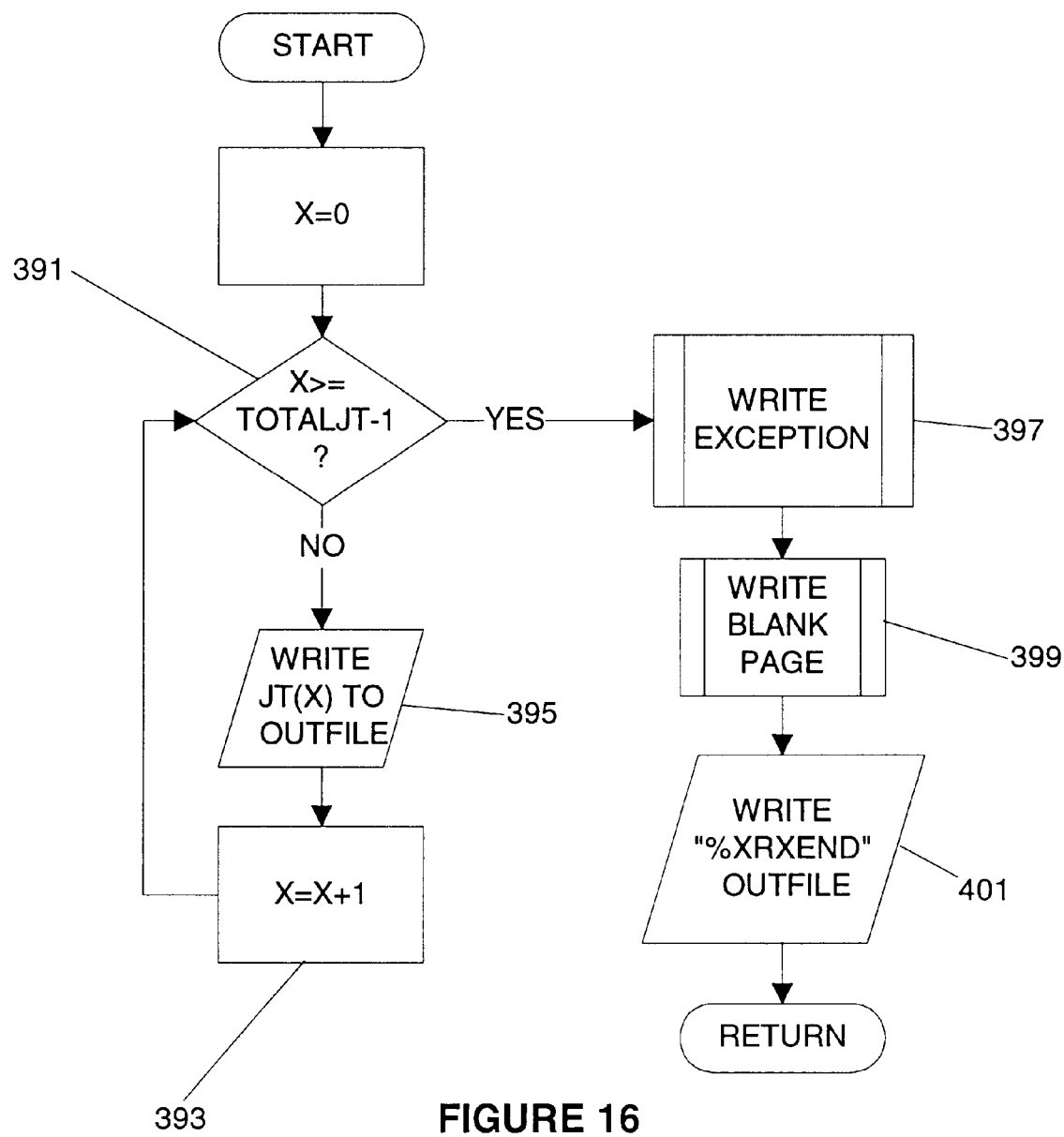
FIG. 16 is a flow diagram of the Create Job Ticket routine of FIG. 9.

Referring to FIG. 16, there will be described the Create Job Ticket procedure which writes the new job ticket for the file. A counter is set up and incrimated at 391 and 393. The original job tickets were stored in a variable and the procedure goes through and writes out at 395, the ones to be retained to a new file. Then the procedure writes out the exception pages at 397 and the blank pages at 399 and the last record is written at 401. The Job Ticket code or procedure for FIG. 16 is disclosed in Table 1, Lines 1–27.

Figure 17:
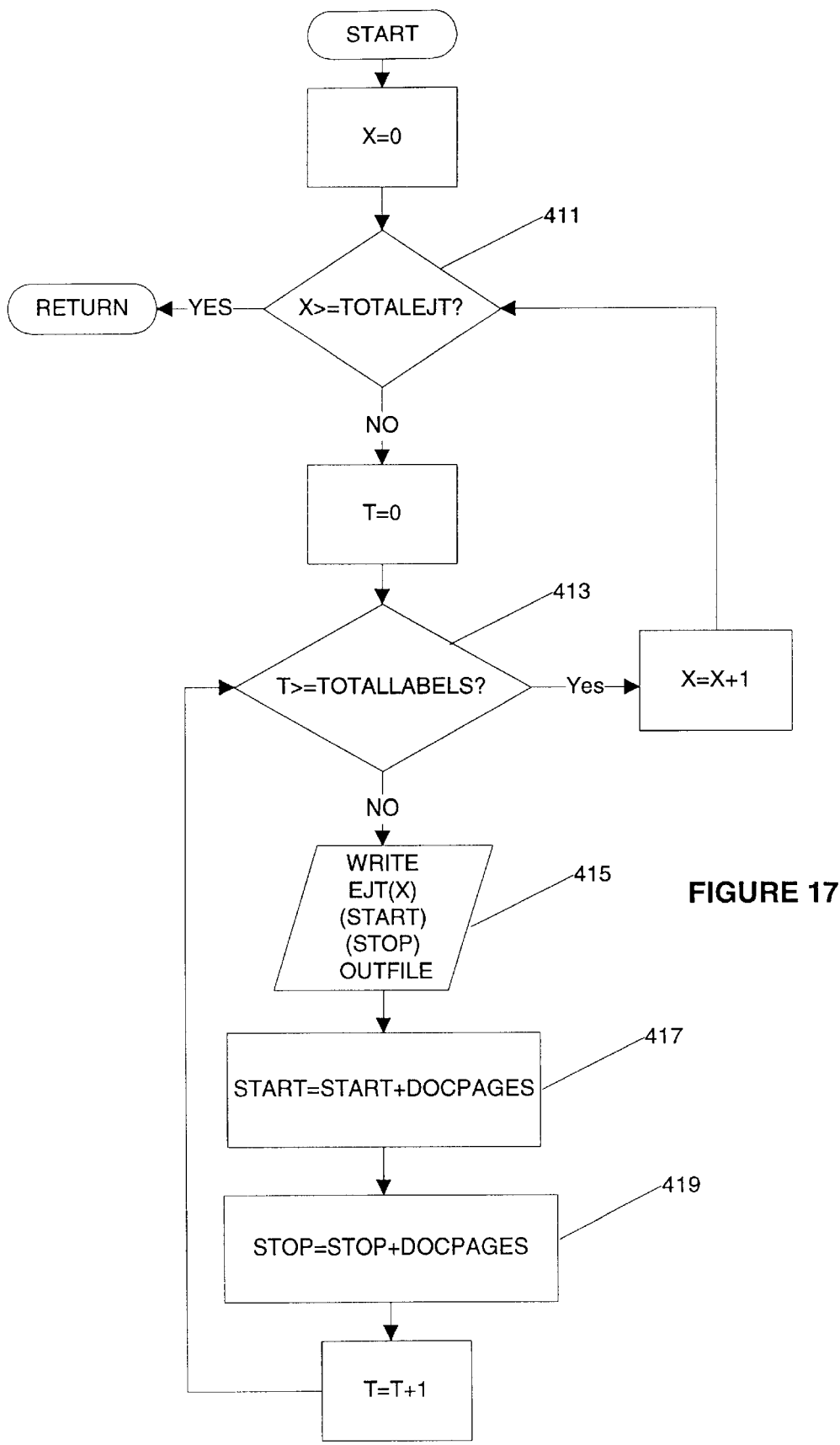
FIG. 17 is a flow diagram of the Write Exception routine of FIG. 16.

Referring to FIG. 17, the write exception procedure will be described. The procedure writes the original Exception record, then writes copies of the record, one for each set. The "start" page and "stop" page values are incriminated for each set by the total number of pages in the document. In carrying out the procedure, a variable is set to zero and the procedure goes through a loop for each exception record beginning at 411. There is a count which is the total exception page job ticket records. If the count is greater than the total number of records, the procedure exits. If it is not, the procedure goes through a loop for each set beginning at 413 which determines if a variable is greater than the total number of labels (the total number of sets to be produced). If it is not, the exception job ticket is written out at 415 which includes the start position, the stop position and the trailer position. The "start" page and "stop" page values are incriminated at 417 and 419 for each set by the total number of pages in the document. The PostScript code or procedure of FIG. 16 is disclosed in Table 1, Lines 21–27.

Figure 18:
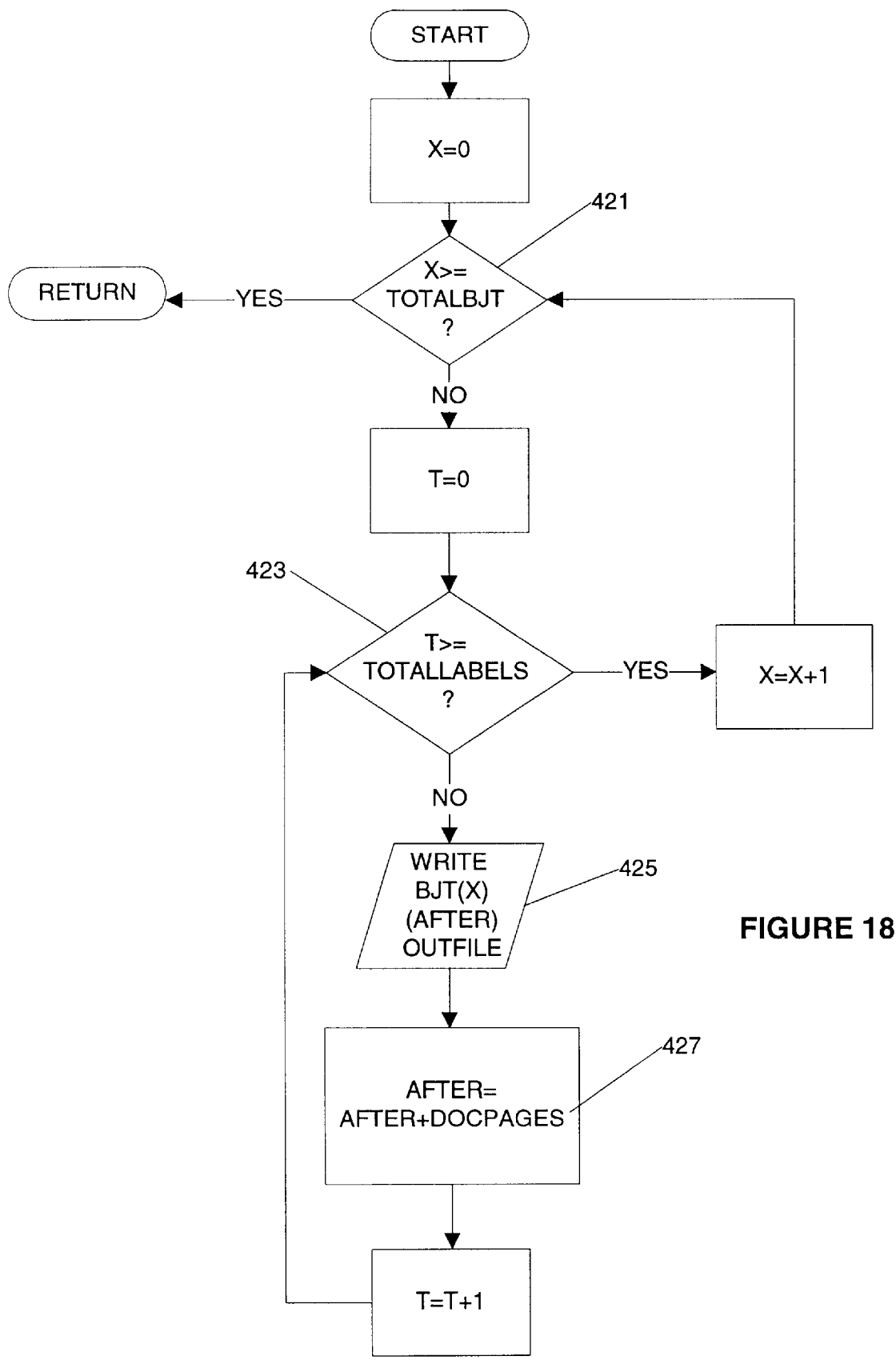
FIG. 18 is a flow diagram of the Write Blank Page routine of FIG. 16.

Referring to FIG. 18, there will be described the Write-BlankPage routine. The procedure writes the original Blank insert record and then writes copies of the record, one for each set. The "after" page value is incriminated for each set by the total number of pages in the document. The flow is very similar to that of the Write Exception. A variable is set to zero and the procedure goes through a loop for each blank insert record beginning at 421. There is a count which is the total blank page job ticket records. If the counter is greater than the total number of records, the procedure exits. If it is not, the procedure goes through a loop for each set beginning at 423 which determines if a variable is greater than the total number of labels (the total number of sets to be produced). If it is not, the blank page job ticket is written out at 425. In this case there is only one variable to increment, at 427, which is the page after the blank page is to be inserted.

Figure 19:
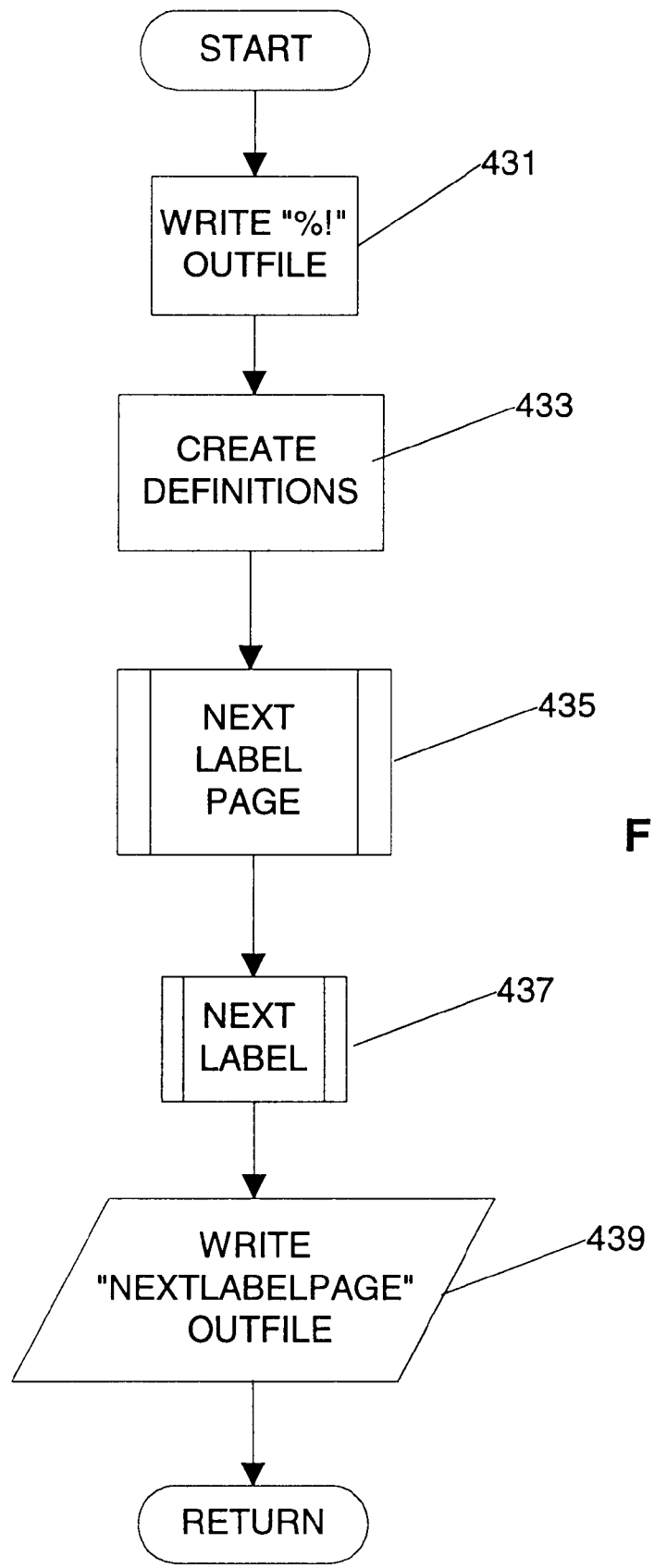
FIG. 19 is a flow diagram of the Create Post Script Header routine of FIG. 9.

Referring to FIG. 19, there will be described the procedure of the PostScriptHeader. Every PostScript file begins with "%!". This record is created at 431. The definitions then are created at 433. The definitions referenced are as follows:

/LabelW-label width, /LabelH-label Height, /Xoffset, /Yoffset, /docX-X location for label, /docY-Y location for label, /xColumns-number of label columns per page, /xRows-number of label rows per page, /sets_for_this_file sets to produce, /LabelFile-buffer to read in label tiff path and name. This is also where the PostScript code is created that when executed will open the label ".LST" file.

At 435 and 437 there are created PostScript macros. At 439 the next label page is written to the output file. The PostScript Code for 431, 433 is disclosed in Table 1, Lines 28–40.

Figure 20:
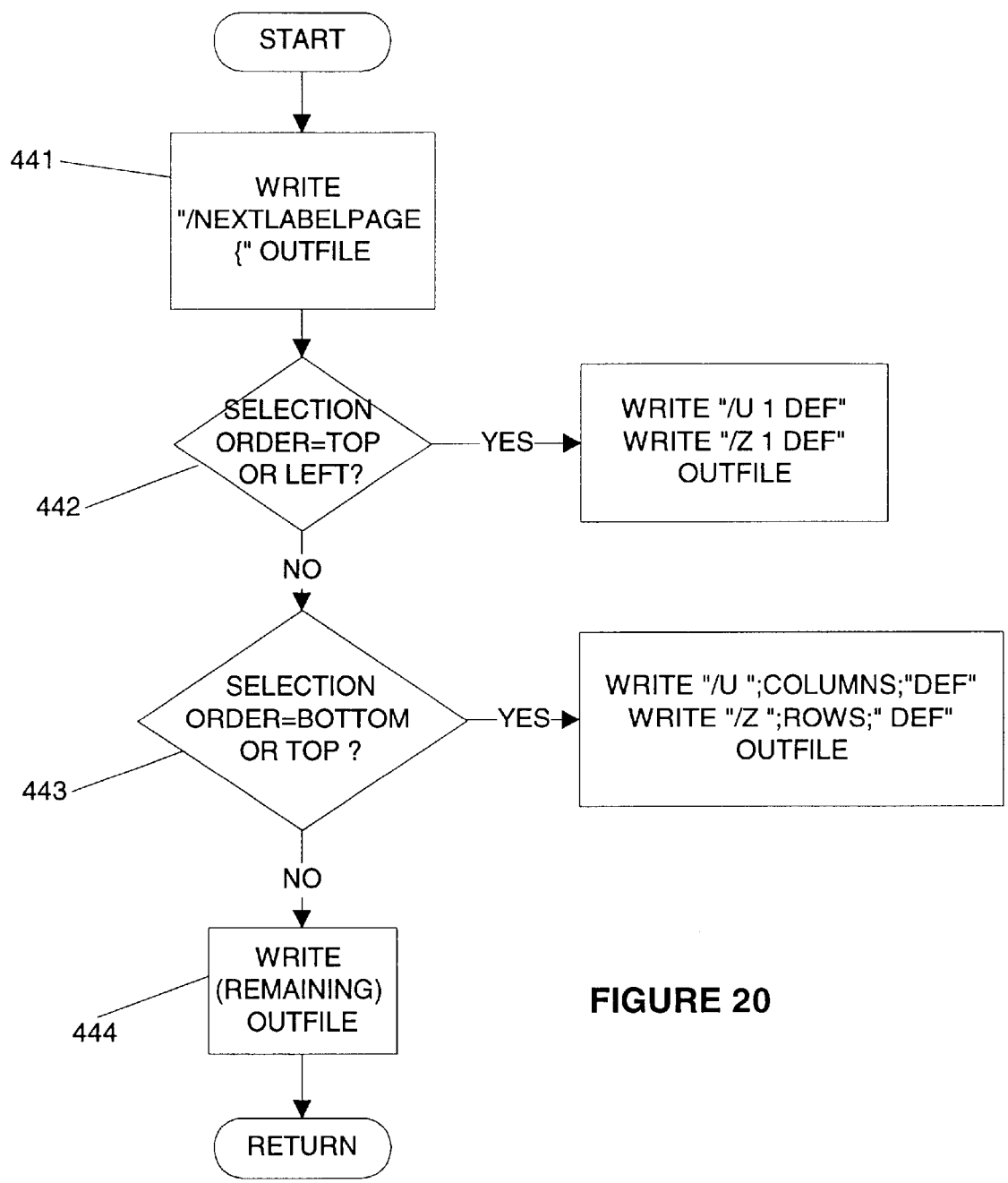
FIG. 20 is a flow diagram of the Next Label Page routine of FIG. 19.

Referring to FIG. 20, there will be described the next label page routine. Generally there will be a number of labels on a page and a number of pages of labels. The purpose of this routine is to write the PostScript Code so that after all of the labels on a given page have been used or exhausted, the print file will know how to transition to the next page of labels and obtain the coordinates of the first label. At 441 the beginning of the definitions are written in PostScript language. At 442 and 443 the selection order is determined. In this program the user has the option of selecting labels left to right, top to bottom, right to left or bottom to top. U is a variable that represents the columns and Z is a variable that represents the rows. If for example, the selection order is from top down or left to right, the U and Z may both be equal to one. Box 44 writes out the remainder of the PostScript Code which determines how a transition is made from one page to the next. This code portion is disclosed in Table 1, Lines 41–49 and it, in effect, when called, it instructs the printer to:

obtain the name and location of the tiff image that represents the next label page.
  defines the variables U and Z to represent the row and column where the first label of the page is located.
  calculates the X and Y coordinates of the lower left corner of the first label of the page.
  calculates the origin of the label page relative to the origin of the document page so that the first label will be located in the correct position on the document page.

Figure 21:
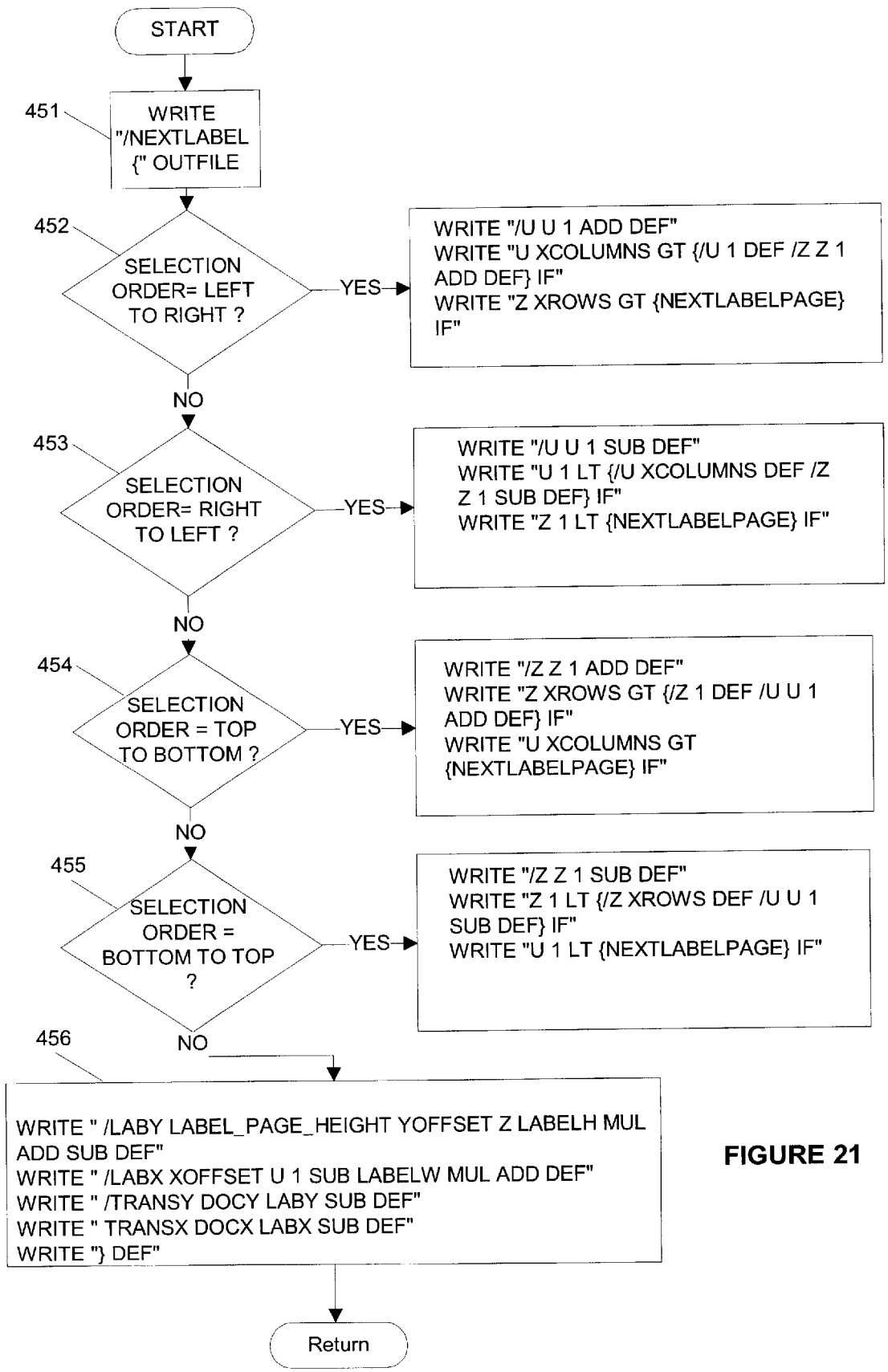
FIG. 21 is a flow diagram of the Next Label routine of FIG. 19.

Referring to FIG. 21, there will be described the next label routine. The next label process generates a PostScript procedure that when executed at the printer, will transition to the next label by: incrementing or decrementing the row and column variables as appropriate, calculates the X and Y coordinates of the label, calculates the coordinates of the origin of the label page relative to the document page so that the label will be positioned at the correct location, and if the last label has been exhausted from the current page, calls the "next label page" macro. The PostScript Code or language generated from the flow chart is found in Table 1, Lines 50–58.

At 451 a definition is set up for the procedure and at 452, 453, 454, and 455 a selection order is determined; left to right, right to left, top to bottom or bottom to top. Depending on selection order, at 452A, 453A, 454A or 455A, a formula is built for transitioning from one label to the next until all of the labels on the page are exhausted. When selected, each of 452A, 453A, 454A, 455A, writes records to the output file which is a PostScript file which when called, creates documents with images of labels on them. At 456 the remainder of the macro called next label is written and when called transitions to the next label by: incrementing or decrementing, the row and column variables as appropriate, calculates the X and Y coordinates of the label, calculates the coordinates of the origin of the label page relative to the document page so that the label will be positioned at the correct location, and if the last label has been exhausted from the current page, calls the "next label page" macro.

Figure 22:
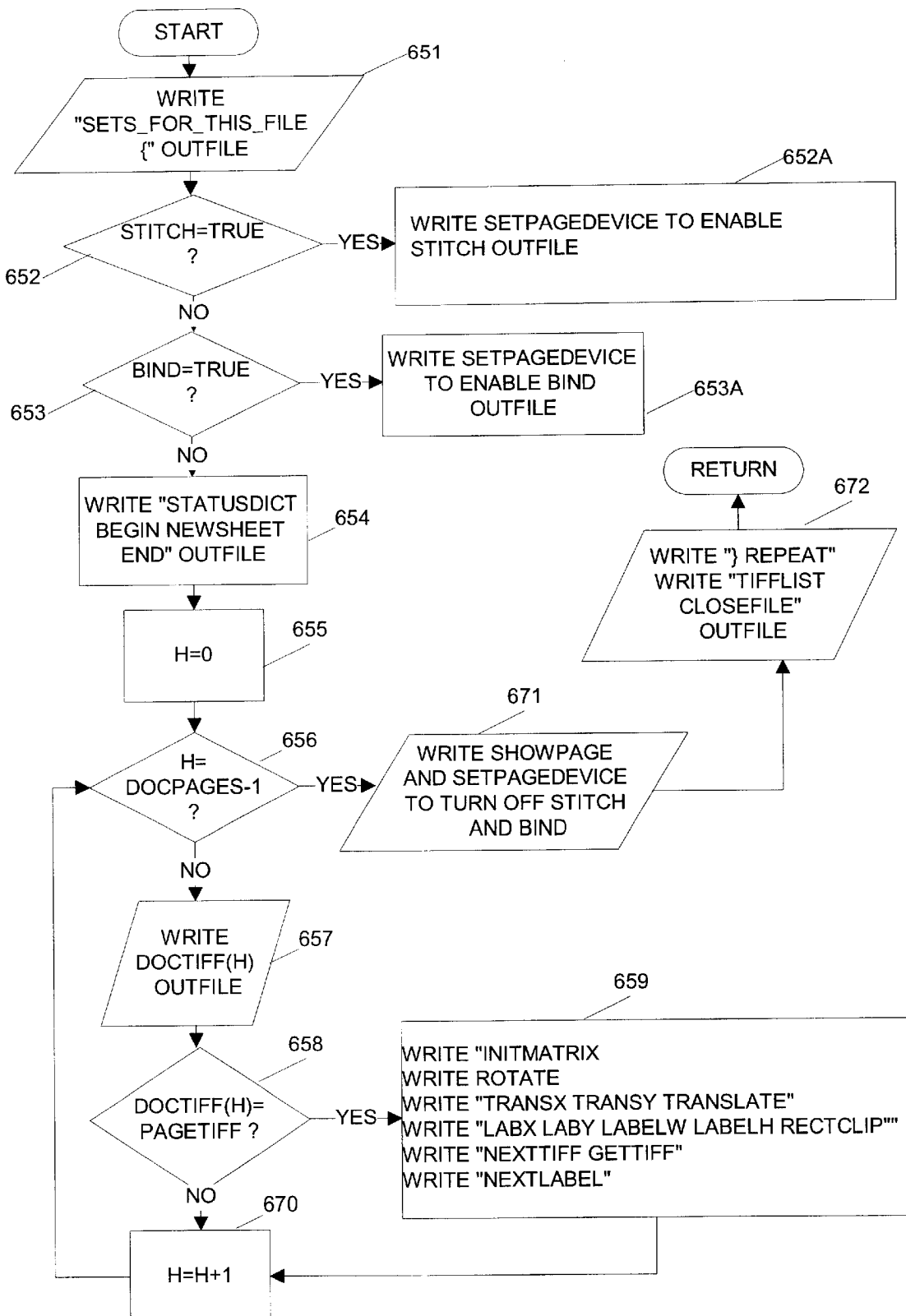
FIG. 22 is a flow diagram of the Create Post Script Loop routine of FIG. 9.

Referring now to FIG. 22, there will be described the Create PostScript Loop. At 651 the beginning of the PostScript loop is written to the output file. This consists of a number representing how many times to execute the loop and the start of the loop itself represented by "{". In box 651 the number of times to execute the loop is represented by a PostScript variable named "sets_for_this_file". If the variable stitch is true a PostScript Command is written at 652A to do the stitching whether it is dual, landscape or single portrait. If bind is true, a PostScript binding Command is written at 653A. At 654, the first image of the set is instructed to be on a new sheet of paper. At 655 a counter H is set to zero and at 656 a decision is made to determine if the counter is greater than the total number of pages minus one. If the answer is "no" then doctiff(h) is written at 657. At 658 a decision is made as to whether doctiff(h) is equal to Page tiff which is the page to which the label is to be applied. If the answer is "yes", then the PostScript Code is written at 659. The matrix is initialized which sets everything back to a default status. If the page is to be rotated, the rotation PostScript Code is written. The label page is translated to the correct location where it is to overlay the document page and a command rectclip is carried out such that a rectangular clip is made such that everything on the label page outside of the clip is discarded. Next a PostScript macro "get tiff" is carried out to obtain the tiff image of the next label. Then the PostScript command to call the macro "nextlabel" is written to the output file. H is incriminated at 670 and the process returns to 656. Each page of the document is imaged to determine if it is to have a label placed thereon until all of the document pages are imaged.

Next at 671, staple and bind are turned off and the loop is closed at 672. The last part of the process is to close the out file and at that point the file will be sent to the Xerox printer with a label on each set.

The PostScript Code for the flow chart of FIG. 22 is disclosed in Table 1, Lines 59–106.

Figure 23A:
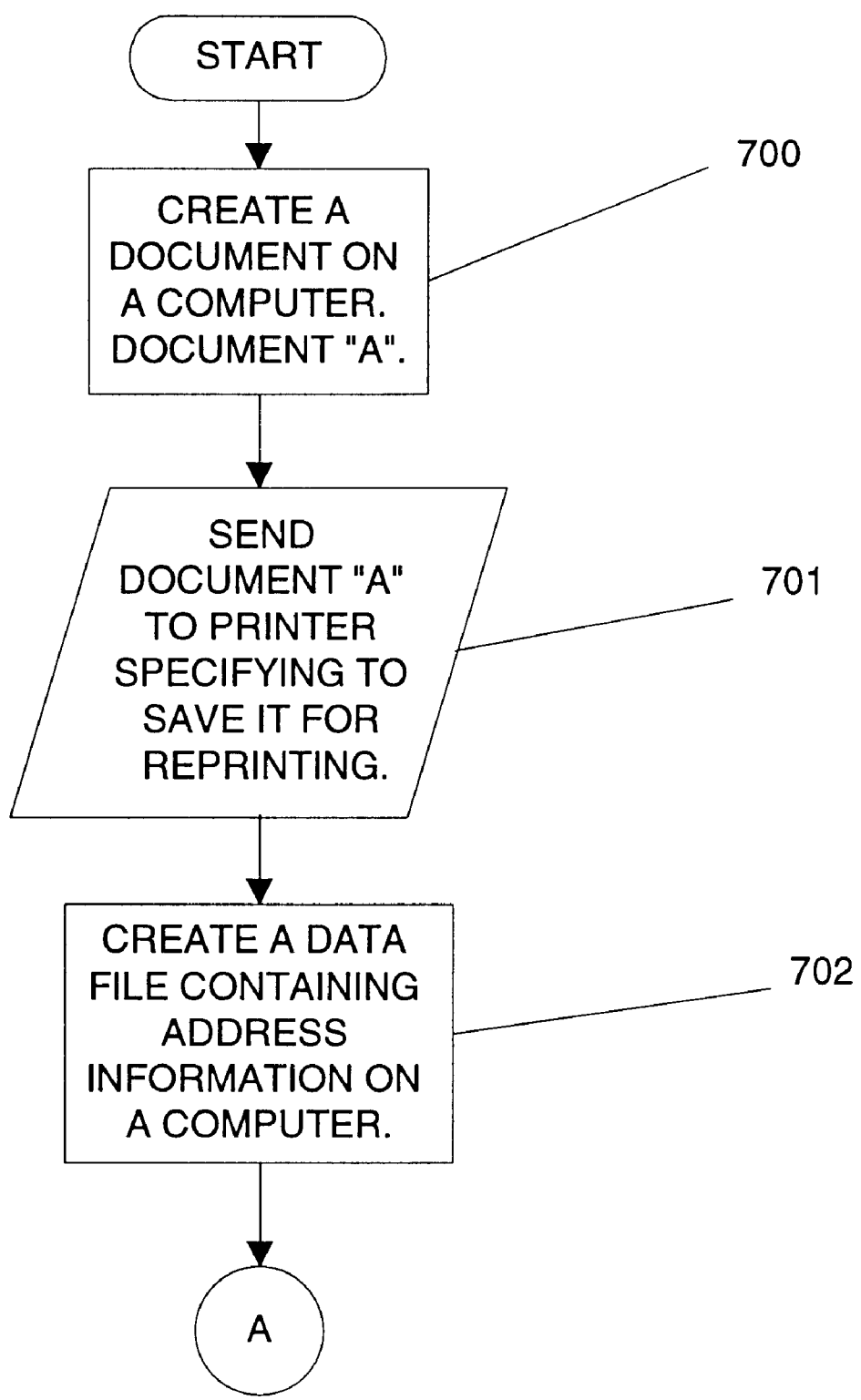
FIGS. 23A, 23B, and 23C are a flow diagram of another embodiment of the invention.
Figure 23B:
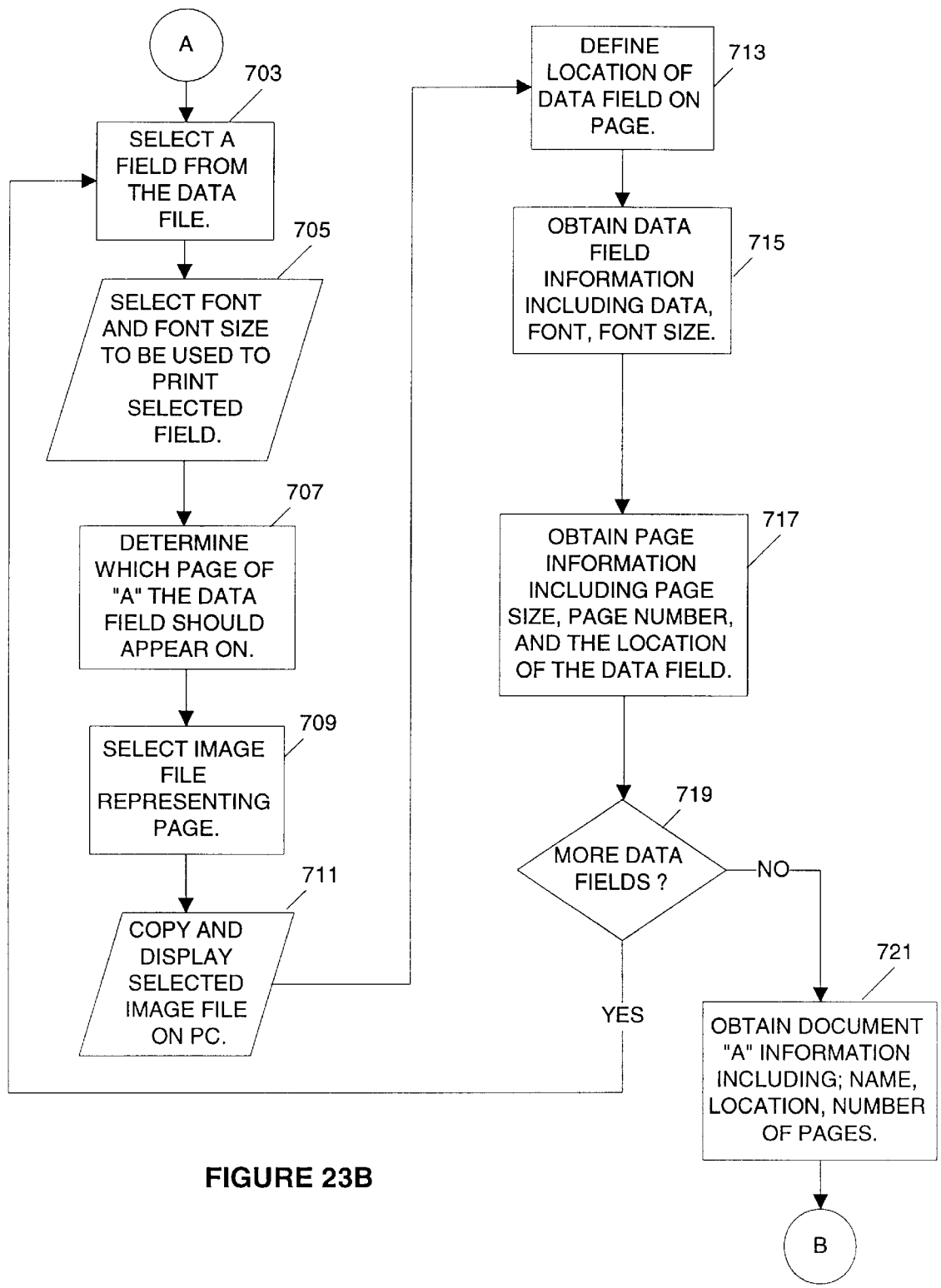
Figure 23C:
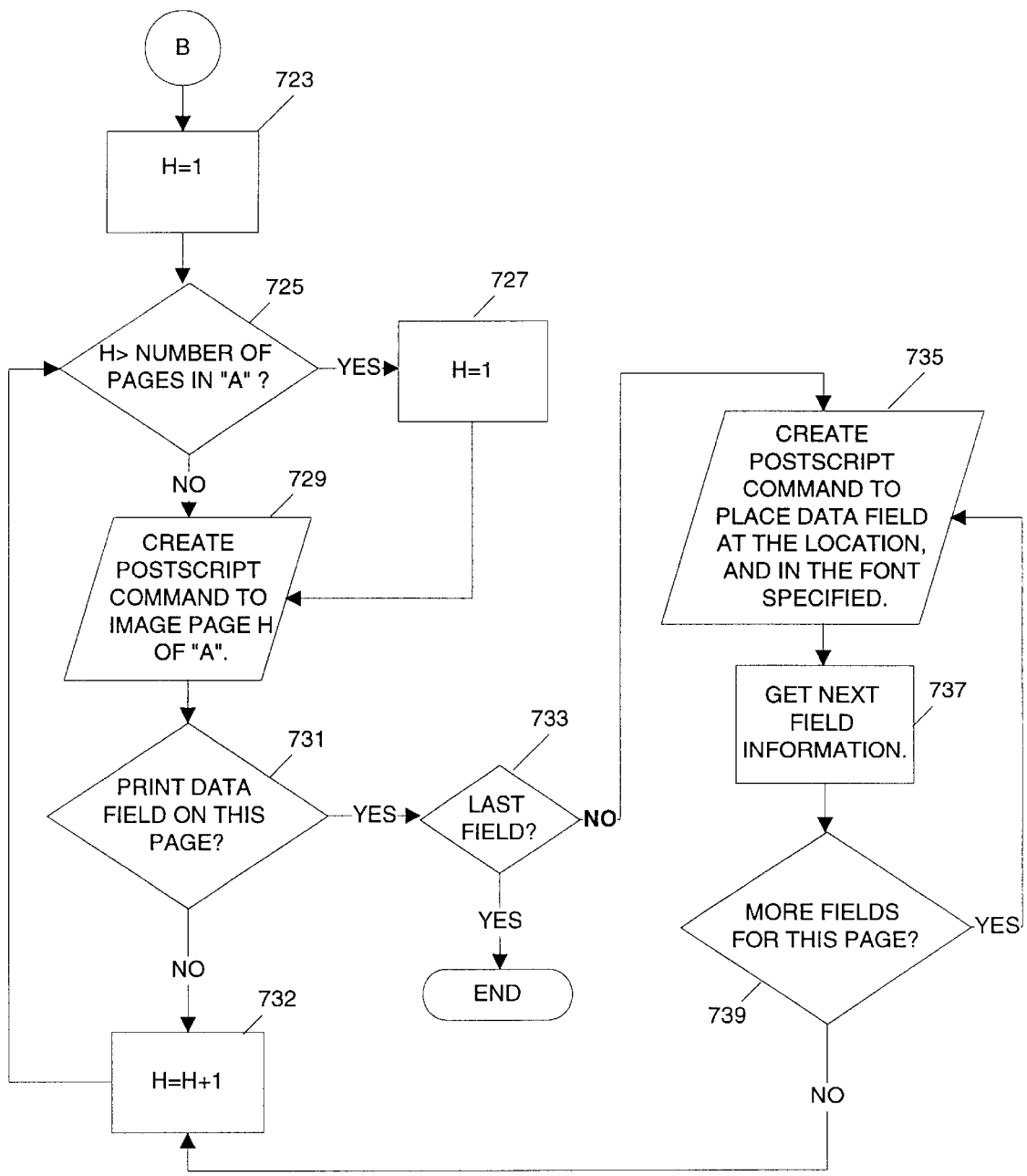

Referring now to FIGS. 23A, 23B, and 23C, there will be described the embodiment wherein data from a file is merged with a document.

A main document is created on the computer at 700 and sent to the printer at 701 and saved for reprinting. The document may have one or many pages. When a document is saved at the printer, the printer will create an image file for each page in the document. The image files are saved to a disk drive so that they may be retrieved for printing at a later time. A data file having address information is created on the computer at 702. It is to be understood that the print document may be saved in the directory or hard rive 101D of the computer rather than in the hard drive 105D. Next at 703, the operator selects a field from the data file which for example may be a name field having a plurality of names, each having associated therewith address information. Next at 705 the operator selects the Font and Font size to be used to print the selected field. At 707, a determination is made as to which page of the document "A" the data field should appear on. At 709, the operator selects the image file representing the page determined at 707. At 711 the image file is copied and displayed on the monitor of the computer. At 713 the location of the data field on the document page is defined. At 715, there is obtained data field information including data, font, font size. At 717 there is obtained stored page information including page size, page number, and the location of the data field. If there are more data fields, the process cycles back at 719. If not, at 721 there is obtained document "A" stored information including name, location, number of pages.

At 723 there is provided a counter for the document "A". At 725, 727, 729, 731, 732 there is created a PostScript command to image all of the pages of document "A". At 731 a decision is made whether to print a data field on the current page. If not, the counter is incriminated at 732 and the process cycles back to 725. If it is determined that a data field is to be printed on the current page, a determination is made at 733 whether this is the last field. If it is, the process terminates. The file is stored ready to be sent to the printer to produce the document. If not, at 735, a PostScript command is created to place the data field at the desired location on the document page, and in the font specified. Next at 737, the next field information is obtained. A determination is made at 739 as to whether there are more fields for the current page. If the answer is yes, the process goes back to 735. If the answer is no, the process goes back to the counter 732.

TABLE 1

1. %XRXbegin: 001.0200
2. %XRXtitle: ZOBALO
3. %XRXaccount: 999999999999
4. %XRXdisposition: PRINT
5. %XRXdeleteSource: True
6. %XRXPDLformat: PS-Adobe 2
7. %XRXresolution: 600
8. %XRXsenderName: Default User
9. %XRXoutputLocation: SystemSpecified
10. %XRXdeliveryHint: SystemSpecified SystemSpecified
11. %XRXxImageShift: 0
12. %XRXx2ImageShift: 0
13. %XRXyImageShift: 0
14. %XRXy2ImageShift: 0
15. %XRXrequirements: duplex
16. %XRXdocumentpaperColors: white
17. %XRXpaperType-preFinish: Plain 0 0
18. %XRXpaperType-opacity: opaque
19. %XRXpaperType-size: 216 279
20. %XRXpaperType-weight: 75
21. %XRXpageExceptions-medium: 1 1 216 279 green opaque Plain 0 0 75
22. %XRXpageExceptions-medium: 17 17 216 279 green opaque Plain 0 0 75
23. %XRXpageExceptions-medium: 16 16 216 279 green opaque Plain 0 0 75
24. %XRXpageExceptions-medium: 32 32 216 279 green opaque Plain 0 0 75
25. %XRXpageExceptions-plex: 1 1 simplex
26. %XRXpageExceptions-plex: 17 17 simplex
27. %XRXend
28. %!

TABLE 1-continued

29. /LabelW 288 def
30. /LabelH 72 def
31. /label_page_height 792 def
32. /Xoffset 7.2 def
33. /Yoffset 28.8 def
34. /docX 0 def
35. /docY 0 def
36. /xColumns 2 def
37. /xrows 10 def
38. /sets_for_this_file 2 def
39. /LabelFile 1000 string def
40. (/var/spool/save/list.1st) (r) file /tifflist exch def
41. /nextlabelpage {
42. /u 1 def
43. /z 1 def
44. /labY label_page_height Yoffset z LabelH mul add sub def
45. /labX Xoffset u 1 sub LabelW mul add def
46. /transY {docY labY sub} def
47. /transX {docX labX sub} def
48. tifflist LabelFile readline {/nexttiff exch def} if
49. } def
50. /nextlabel }
51. /u u 1 add def
52. u xColumns gt {/u 1 def /z z 1 add def} if
53. z xrows gt {nextlabelpage} if
54. /labY label_page_height Yoffset z LabelH mul add sub def
55. /labX Xoffset u 1 sub LabelW mul add def
56. /transY {docY labY sub} def
57. /transX (docX labX sub) def
58. } def
59. nextlabelpage
60. sets_for_this_file { %Beginning of Repeat Loop
61. <<
62. /Staple 3 /StapleDetails
63. <<Type 1 /StapleLocation (DualLandscape)>>
64. >>setpagedevice
65. (/var/spool/save/march_dir/march.p00000001.tif) GetTiff
66. initmatrix
67. /docX 162.72 def
68. /docY 469.44 def
69. transX transY translate
70. labX labY LabelW LabelH rectclip
71. nexttiff GetTiff
72. nextlabel
73. showpage
74. (/var/spool/save/march_dir/march.p00000002.tif) GetTiff
75. showpage
76. (/var/spool/save/march_dir/march.p00000003.tif) GetTiff
77. showpage
78. (/var/spool/save/march_dir/march.p00000004.tif) GetTiff
79. showpage
80. (/var/spool/save/march_dir/march.p00000005.tif) GetTiff
81. showpage
82. (/var/spool/save/march_dir/march.p00000006.tif) GetTiff
83. showpage
84. (/var/spool/save/march_dir/march.p00000007.tif) GetTiff
85. showpage
86. (/var/spool/save/march_dir/march.p00000008.tif) GetTiff
87. showpage
88. (/var/spool/save/march_dir/march.p00000009.tif) GetTiff
89. showpage
90. (/var/spool/save/march_dir/march.p00000010.tif) GetTiff
91. showpage
92. (/var/spool/save/march_dir/march.p00000011.tif) GetTiff
93. showpage
94. (/var/spool/save/march_dir/march.p00000012.tif) GetTiff
95. showpage
96. (/var/spool/save/march_dir/march.p00000013.tif) GetTiff
97. showpage
98. (/var/spool/save/march_dir/march.p00000014.tif) GetTiff
99. showpage
100. (/var/spool/save/march_dir/march.p00000015.tif) GetTiff
101. showpage
102. (/var/spool/save/march_dir/march.p00000016.tif) GetTiff
103. showpage
104. <</Staple 0 /Bind 0>> setpagedevice
105. } repeat
106. tifflist closefile

TABLE 2

%XRXbegin: 001.0200
%XRXintegrity: False False True 003824886756
%XRXdisposition: PRINT
%XRXtitle: march
%XRXdeleteSource: True
%XRXPDLformat: PS-Adobe 2
%XRXsourceFile: UNIX: /var/spool/save/march.ps
%XRXpagesToPrint: 1 16
%XRXreprint: Print_On_Demand
%XRXresolution: 600
%XRXcopyCount: 500
%XRXaccount: 999999999998
%XRXsenderName: Default User
%XRXrequirements: collated
%XRXedgeStitchPosition: standard top
%XRXedgeStitchPosition: standard bottom
%XRXoutputLocation: SystemSpecified
%XRXdeliveryHint: SystemSpecified SystemSpecified
%XRXxImageShift: 0
%XRXx2ImageShift: 0
%XRXyImageShift: 0
%XRXy2ImageShift: 0
%XRXrequirements: duplex
%XRXdocumentPaperColors: white
%XRXpaperType-preFinish: Plain 0 0
%XRXpaperType-opacity: opaque
%XRXpaperType-size: 216 279
%XRXpaperType-weight: 75
%XRXpageExceptions-medium: 1 1 216 279 green opaque Plain 0 0 75
%XRXpageExceptions-medium: 16 17 216 279 green opaque Plain 0 0 75
%XRXpageExceptions-plex: 1 1 simplex
%XRXend

TABLE 3

/var/spool/save/march_dir/march.p00000001.tif
/var/spool/save/march_dir/march.p00000002.tif
/var/spool/save/march_dir/march.p00000003.tif
/var/spool/save/march_dir/march.p00000004.tif
/var/spool/save/march_dir/march.p00000005.tif
/var/spool/save/march_dir/march.p00000006.tif
/var/spool/save/march_dir/march.p00000007.tif
/var/spool/save/march_dir/march.p00000008.tif
/var/spool/save/march_dir/march.p00000009.tif
/var/spool/save/march_dir/march.p00000010.tif
/var/spool/save/match_dir/march.p00000011.tif
/var/spool/save/march_dir/march.p00000012.tif
/var/spool/save/march_dir/march.p00000013.tif
/var/spool/save/march_dir/march.p00000014.tif
/var/spool/save/march_dir/march.p00000015.tif
/var/spool/save/march_dir/march.p00000016.tif

What is claimed is:

1. A process of printing images of labels on multiple sets of a document using a network system including a printer means capable of printing and saving documents in such a way that each page is rendered according to the printer means instructions then stored as an image file, with the document description and properties stored in one or more related files, at least one computer with a monitor, software installed on said computer capable of displaying image files created by saving documents on said printer means and capable of creating printer instructions, and a storage means accessible by said computer and by said printer means by way of a communication medium coupled to said computer and to said printer means, comprising the steps of:

sending a main document comprising a plurality of pages to said printer means with instructions to save on said storage means as a stored image file for each page of said main document, sending a label document comprising a plurality of labels to said printer means with instructions to save on said storage means as a stored image file for each page of said label document, using said software to select a saved label image file representing a page of said label document, having labels thereon, displaying said selected label image file on said monitor of said computer, defining the layout of said labels and storing said layout, storing label document information including name, saved location, layout information, number of labels per page of said label document and the number of pages of said label document, determining a page of said main document on which a label should appear, selecting a document image file representing a page of said main document, displaying said selected document image file on said monitor of said computer, defining the location of a label on said page of said main document, creating printer instructions that when sent to said printer means will create multiple sets of a document each having a unique label thereon by carrying out the following steps at the printer means for each set:
  (a) retrieving said stored image file for a page of said set of said main document,
  (b) if the main document page from step (a) contains a label, retrieving said label image file,
  (c) if the main document page from step (a) contains a label, positioning said label image file such that a given label image is at said defined location,
  (d) if the main document page from step (a) contains a label, removing any part of said label image file that does not represent the given label,
  (e) printing a page of said retrieved main document, if the main document page from step (a) contains a label, with a unique label at said defined location, repeating steps (a), (b), (c), (d) (e) to generate several sets of said document with a different label image located at a defined location.

2. A process of printing data on multiple sets of a document using a network system including a printer means capable of printing and saving documents in such a way that each page is rendered according to the printer instructions, then stored as an image file, with the document description and properties stored in one or more related files, at least one computer with a monitor and a storage means accessible by said computer and by said printer means by way of a communication medium coupled to said computer and to said printer means, software installed on said computer means capable of displaying image files created by saving documents on said printer means, and capable of creating printer instructions, comprising the steps of:

sending a document comprising a plurality of pages to said printer means with instructions to save on said storage means, obtaining on said computer, a data file containing information, selecting a data field from said data file, determining a page of said document on which said selected data field should appear, selecting a document image file representing a page of said document, displaying said selected document image file on said monitor of said computer, defining the location of a data field on said page of said document, creating printer instructions that when sent to said printer means will create multiple sets of a document each having a unique data field thereon by carrying out of the following steps at the printer means for each set:
- (a) retrieving said stored image file for a page of said set of said main document,
- (b) if the main document page from step (a) contains a data field, retrieving said data field,
- (c) if the main document page from step (a) contains a data field, positioning said data field such that a given data field is at said defined location for at least one page of said set of said main document,
- (d) printing a page of said retrieved main document, if the main document page from step (a) contains a data field, with a unique data field at said defined location, repeating steps (a), (b), (c), (d) to generate several sets of said document with a different data field located at a defined location.

* * * * *